US012770967B2

(12) United States Patent
Wu et al.

(10) Patent No.: US 12,770,967 B2
(45) Date of Patent: Oct. 20, 2026

(54) BATTERY, ELECTRICAL APPARATUS, AND METHOD AND APPARATUS FOR MAKING BATTERY

(71) Applicant: CONTEMPORARY AMPEREX TECHNOLOGY (HONG KONG) LIMITED, Hong Kong (CN)

(72) Inventors: Xiayi Wu, Ningde (CN); Jingjing Yu, Ningde (CN); Wenzhong Liu, Ningde (CN); Yu Tang, Ningde (CN); Zhenhua Li, Ningde (CN); Xing Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 471 days.

(21) Appl. No.: 18/536,262

(22) Filed: Dec. 12, 2023

(65) Prior Publication Data

US 2024/0120603 A1 Apr. 11, 2024

Related U.S. Application Data

(63) Continuation of application No. PCT/CN2021/117625, filed on Sep. 10, 2021.

(51) Int. Cl.
*H01M 50/289* (2021.01)
*H01M 50/209* (2021.01)
(Continued)

(52) U.S. Cl.
CPC ....... *H01M 50/289* (2021.01); *H01M 50/209* (2021.01); *H01M 50/262* (2021.01); *H01M 50/271* (2021.01)

(58) Field of Classification Search
CPC ............. H01M 50/289; H01M 50/209; H01M 50/262; H01M 50/271; H01M 50/249;
(Continued)

(56) References Cited

U.S. PATENT DOCUMENTS 5,731,058 A 3/1998 Juso et al.
8,703,319 B1 * 4/2014 Aston ................ H01M 10/613 429/120

(Continued)

FOREIGN PATENT DOCUMENTS

CN 109585471 A 4/2019
CN 110190218 A 8/2019

(Continued)

OTHER PUBLICATIONS

Google translation CN110190218 (Year: 2026).*

(Continued)

*Primary Examiner* — Jennifer Dieterle
(74) *Attorney, Agent, or Firm* — K&L Gates LLP

(57) ABSTRACT

Provided are a battery, an electrical apparatus, and a method and an apparatus for making a battery. The battery comprises: a battery cell; a first component, wherein a first surface of the first component is connected to at least one of the battery cells through an adhesion member, the adhesion member comprises a first adhesion structure and a second adhesion structure, the first adhesion structure is located at the periphery of the second adhesion structure, and the first adhesion structure has an elongation at break greater than that of the second adhesion structure. The battery, the electrical apparatus, and the method and the apparatus for making the battery according to the embodiments of the present application can enhance the safety of the battery.

20 Claims, 9 Drawing Sheets

(51) Int. Cl.
*H01M 50/262* (2021.01)
*H01M 50/271* (2021.01)

(58) Field of Classification Search
CPC ........... H01M 2220/20; H01M 50/211; H01M 50/242; H01M 50/264; H01M 50/204; B32B 3/12; B32B 27/308; B32B 2250/40; B32B 2307/54; B32B 2457/10; B32B 7/12; B32B 25/20; B32B 27/38; B32B 27/40; Y02E 60/10; C09J 7/00
See application file for complete search history.

(56) References Cited

U.S. PATENT DOCUMENTS

| | | | | |
|---|---|---|---|---|
| 10,680,025 | B2 | 6/2020 | Shim et al. | |
| 11,101,515 | B2 | 8/2021 | Shi et al. | |
| 11,133,549 | B2 | 9/2021 | Shi et al. | |
| 2009/0062670 | A1* | 3/2009 | Sterling | G06Q 10/10 600/509 |
| 2010/0081976 | A1* | 4/2010 | Bolla | A61F 5/03 602/5 |
| 2015/0230719 | A1* | 8/2015 | Berg | A61B 5/0024 29/832 |
| 2019/0103432 | A1 | 4/2019 | Shim et al. | |
| 2019/0259995 | A1* | 8/2019 | Motohashi | H01M 50/271 |
| 2020/0148917 | A1* | 5/2020 | Heilmann | C09J 7/21 |
| 2020/0224060 | A1 | 7/2020 | Krull et al. | |
| 2020/0358049 | A1 | 11/2020 | Shi et al. | |
| 2020/0365847 | A1 | 11/2020 | Jin et al. | |
| 2021/0091437 | A1 | 3/2021 | Chen et al. | |
| 2021/0119290 | A1 | 4/2021 | Shi et al. | |
| 2021/0119292 | A1 | 4/2021 | Jin et al. | |
| 2021/0171805 | A1 | 6/2021 | Krull et al. | |
| 2023/0060428 | A1* | 3/2023 | Huang | H01M 50/466 |

FOREIGN PATENT DOCUMENTS

| | | | | |
|---|---|---|---|---|
| CN | 111446482 | A | | 7/2020 |
| CN | 211017287 | U | | 7/2020 |
| CN | 110190218 | | * | 9/2020 |
| CN | 112310525 | A | | 2/2021 |
| EP | 0725378 | A1 | | 8/1996 |
| JP | 2019040809 | A | | 3/2019 |
| JP | 2021512990 | A | | 5/2021 |
| KR | 20190038032 | A | | 4/2019 |
| KR | 20200038307 | A | | 4/2020 |
| WO | 2020228485 | A | | 11/2020 |

OTHER PUBLICATIONS

Notice of Reasons for Refusal received in the counterpart Japanese application 2023-524943, mailed on Jan. 7, 2025.
Request for the Submission of an Opinion received in the counterpart Korean application 10-2023-7013960, mailed on Mar. 19, 2025.
Notice of Allowance (with English Machine Translation), mailed Nov. 10, 2025, for corresponding Korean Patent Application Serial No. 10-2023-7013960.
International Search Report received in the corresponding International Application PCT/CN2021/117625, mailed May 20, 2022.
Written Opinion received in the corresponding International Application PCT/CN2021/117625, mailed May 20, 2022.
The extended European search report received in the corresponding European Application 21956400.2, mailed on Jul. 8, 2024.
Notice of Reasons for Refusal received in the corresponding Japanese Application 2023-524943, mailed on Jun. 10, 2024.

* cited by examiner

BATTERY, ELECTRICAL APPARATUS, AND METHOD AND APPARATUS FOR MAKING BATTERY

CROSS REFERENCE TO RELATED APPLICATIONS

The present application is a continuation of International Application PCT/CN2021/117625, filed Sep. 10, 2021 and entitled "BATTERY, ELECTRICAL APPARATUS, AND METHOD AND APPARATUS FOR MAKING BATTERY", the entire disclosure of which is incorporated herein by reference.

TECHNICAL FIELD

The present application relates to the technical field of batteries, and in particular to a battery, an electrical apparatus, and a method and an apparatus for making a battery.

BACKGROUND ART

Energy saving and emission reduction is the key to the sustainable development of automobile industry. In such cases, electric vehicles have become an important part of the sustainable development of the automobile industry due to their advantages of energy saving and environmental friendliness. For electric vehicles, battery technology is an important factor related to their development.

In the development of battery technology, in addition to improving battery performances, safety issues are also non-negligible. A battery cannot be used if battery safety cannot be guaranteed. Therefore, how to enhance the safety of a battery is an urgent technical issue in battery technology.

SUMMARY OF THE INVENTION

The present application provides a battery, an electrical apparatus, and a method and an apparatus for making a battery, which can enhance the safety of the battery.

In a first aspect, there is provided a battery comprising: a battery cell; a first component, wherein a first surface of the first component is connected to at least one of the battery cells through an adhesion member, the adhesion member comprises a first adhesion structure and a second adhesion structure, the first adhesion structure is located at the periphery of the second adhesion structure, and the first adhesion structure has an elongation at break greater than that of the second adhesion structure.

Therefore, in the battery according to the embodiments of the present application, the adhesion member comprising two adhesion structures is provided between the battery cell and the first component to fix the battery cell, wherein the first component may comprise a box body of the battery or an upper cover within the box body, so that the first adhesion structure with a higher elongation at break is located at the periphery of the second adhesion structure with a lower elongation at break, so that after the expansion and deformation of the battery cell, the edge position is the first adhesion structure with high elongation at break, which is able to maintain the connection between the battery cell and the upper cover or between the battery cell and the box body fixed, thus improving the stability of the battery cell within the battery, and in turn improving the safety of the battery.

In some embodiments, the elongation at break A1 of the first adhesion structure satisfies: 100%≤A1≤500%; and/or the elongation at break B1 of the second adhesion structure satisfies: 10%≤B1≤150%.

In some embodiments, the elongation at break A1 of the first adhesion structure satisfies: 150%≤B1≤400%; and/or the elongation at break B1 of the second adhesion structure satisfies: 60%≤B1≤120%.

By reasonably setting the elongation at break of the first adhesion structure and the elongation at break of the second adhesion structure, after the expansion and deformation of the battery cell, the connection between the battery cell and the upper cover or between the battery cell and the box body can be maintained fixed through the first adhesion structure with high elongation at break.

In some embodiments, the adhesion member is used for bonding a second surface of at least one of the battery cells to the first surface, and the second adhesion structure covers a central point of the second surface.

Considering that when the battery cell expands, the deformation amount of the central position of the battery cell is larger, and the deformation amount of the edge region is relatively small, that is to say, the distance from the central position of the battery cell to the first surface is smaller than the distance from the edge region to the first surface, so the second adhesion structure with smaller elongation at break and higher strength is provided at the central position, which can cover the central point of the surface of the battery cell where it is located, and can ensure the stability between the battery cell and the first component.

In some embodiments, the first adhesion structure surrounds the periphery of the second adhesion structure.

Considering that when the battery cell expands, the deformation amount of the central position of the battery cell is larger, and the deformation amount of the edge position of the battery cell is smaller, that is to say, the distance from the edge region of the battery cell to the first surface is greater than the distance from the central position to the first surface, so the first adhesion structure with larger elongation at break is provided all around the second adhesion structure, which can reduce the risk of unbonding at the edge region all around the battery cell after the expansion and deformation of the battery cell.

In some embodiments, the adhesion member is used for bonding a second surface of at least one of the battery cells to the first surface, and where the area of the second surface is S0, the contact area of the first adhesion structure with the second surface is S1, the contact area of the second adhesion structure with the second surface is S2, then S0, S1 and S2 satisfy: 0.25≤(S1+S2)/S0<1.

When the contact area of the adhesion member with the first surface or the contact area with the second surface of the battery cell is smaller, the binding force of the adhesion structure to the battery cell is weak, there is a risk of failure due to vibration impact, and the capacity retention rate of the battery cell is poor; whereas when the contact area of the adhesion member with the first surface or the contact area with the second surface of the battery cell is too large, it may cause glue overflow and adhesion to the structural parts such as an electrode terminal of the battery cell or a battery wiring harness, and in turn result in the risk of failure due to vibration impact; therefore, 0.25≤(S1+S2)/S0<1 can ensure that there is no battery failure under vibration, and can also ensure that the capacity retention rate of the battery is in a better range.

In some embodiments, S0, S1, and S2 satisfy: 0.5≤(S1+S2))/S0≤0.85.

Therefore, when 0.5≤(S1+S2)/S0≤0.85, the vibration impact and the capacity retention rate of the battery are better.

In some embodiments, the contact area of the first adhesion structure with the first surface is S1, the contact area of the second adhesion structure with the first surface is S2, and S1 and S2 satisfy: $0.05 \leq S1/(S1+S2) \leq 0.85$.

In some embodiments, S1 and S2 satisfy: $0.15 \leq S1/(S1+S2) \leq 0.55$.

By the area ratio of the first adhesion structure to the second adhesion structure set above, the amount of glue used can be reduced as much as possible while ensuring the structural strength.

The gluing area ratio of the first adhesion structure at the edge position has an influence on the structural strength, and increasing the content of the first adhesion structure in a certain range is beneficial to improving the structural strength of the battery and enhancing the capacity retention rate. When S1/(S1+S2) is equal to 1, that is, only the first adhesion structure is used, the adhesion structure has weak binding strength to the battery structure. When S1/(S1+S2) is equal to 0.02, it indicates that the majority of the adhesion structure is the second adhesion structure, which can lead to the unbonding problem. When $0.05 \leq S1/(S1+S2) \leq 0.85$, it can not only ensure that there is no battery failure under vibration, but also ensure that the capacity retention rate of the battery is in a better range. Especially when $0.15 \leq S1/(S1+S2) \leq 0.55$, the anti-vibration impact performance of the battery is better.

In some embodiments, the elastic modulus of the first adhesion structure is less than that of the second adhesion structure. The elongation at break of a adhesion structure such as a glue is generally negatively correlated with the elastic modulus, and therefore, setting the elastic modulus of the first adhesion structure to be less than the elastic modulus of the second adhesion structure can also ensure that the elongation at break of the first adhesion structure is greater than the elongation at break of the second adhesion structure, so as to reduce the risk of unbonding at the edge of the battery cell.

In some embodiments, the elastic modulus A2 of the first adhesion structure satisfies: $10\ \text{MPa} \leq A2 \leq 150\ \text{MPa}$; and/or the elastic modulus B2 of the second adhesion structure satisfies: $150\ \text{MPa} \leq B2 \leq 1000\ \text{MPa}$.

In some embodiments, the elastic modulus A2 of the first adhesion structure satisfies: $30\ \text{MPa} \leq A2 \leq 60\ \text{MPa}$; and/or the elastic modulus B2 of the second adhesion structure satisfies: $150\ \text{MPa} \leq B2 \leq 500\ \text{MPa}$.

In some embodiments, the strength of the first adhesion structure is less than the strength of the second adhesion structure. The strength of a adhesion structure such as a glue is generally positively correlated with the elastic modulus, while the elongation at break is negatively correlated with the elastic modulus; therefore, a greater strength of the second adhesion structure can ensure the stability of the battery cell, while a greater strength and a greater elongation at break of the first adhesion structure can reduce the risk of unbonding at the edge of the battery cell.

In some embodiments, the strength A3 of the first adhesion structure satisfies: $2\ \text{MPa} \leq A3 \leq 15\ \text{MPa}$; and/or, The strength B3 of the second adhesion structure satisfies: $6\ \text{MPa} \leq B3 \leq 25\ \text{MPa}$.

In some embodiments, the strength A3 of the first adhesion structure satisfies: $6\ \text{MPa} \leq A3 \leq 15\ \text{MPa}$; and/or the strength B3 of the second adhesion structure satisfies: $8\ \text{MPa} \leq B3 \leq 25\ \text{MPa}$.

In some embodiments, the battery comprises a plurality of battery cell groups arranged in a first direction perpendicular to the first surface, each battery cell group of the plurality of battery cell groups comprises at least two battery cells arranged in a second direction perpendicular to the first direction, and the adhesion member is provided between a first battery cell group of the plurality of battery cell groups and the first surface.

In some embodiments, a plurality of the adhesion members are provided between the first battery cell group and the first surface, and the plurality of the adhesion members correspond to the battery cells in the first battery cell group on a one-to-one basis. In this way, the stability of each battery cell can be better ensured when the battery cell expands and deforms.

In some embodiments, one of the adhesion members is provided between the first battery cell group and the first surface to simplify the course of processing.

In some embodiments, a gap is provided between the first adhesion structure and the second adhesion structure.

In the above solution, when materials of the same system with different characteristics are selected for the first adhesion structure and the second adhesion structure, there may be mutual influence between the two; for example, glues of the same polyurethane system with different characteristics are selected as the materials for the first adhesion structure and the second adhesion structure, and the two may react to influence each other. A gap is provided between the first adhesion structure 51 and the second adhesion structure 52, which can reduce the mutual influence between the first adhesion structure 51 and the second adhesion structure 52.

In some embodiments, a blocking member is provided between the first adhesion structure and the second adhesion structure.

It is possible to better avoid the mutual influence between the first adhesion structure and the second adhesion structure by providing the blocking member.

In some embodiments, the material of the first adhesion structure includes at least one of: epoxy resin, polyurethane, acrylic resin and silicone rubber; and/or the material of the second adhesion structure includes at least one of: epoxy resin, polyurethane and acrylic resin.

In some embodiments, the battery comprises a first box body and a second box body that are snap-fitted to form an accommodating space for accommodating the battery cell, and the first component comprises the first box body and/or the second box body.

In some embodiments, the battery comprises the upper cover, the first box body and the second box body, the first box body and the second box body are snap-fitted to form the accommodating space for accommodating the battery cell, the upper cover is provided within the accommodating space and covers the battery cell, and the first component comprises the upper cover.

In some embodiments, the surface of the first box body and/or the second box body with the largest area is the first surface.

With the provision of the above solution, the bonding area between the first component and the battery cell can be increased, and the bonding strength between them can be improved.

In some embodiments, the battery cell comprises: an electrode assembly; a case provided with an opening and having a cavity for accommodating the electrode assembly; and a cover plate for covering the opening of the case.

In some embodiments, the adhesion member is provided between a side wall of the case having the largest area and the first surface.

With the provision of the above solution, the bonding area between the adhesion member and the battery cell can be increased, and the bonding strength between them can be improved.

In a second aspect, there is provided an electrical apparatus comprising: the battery of the first aspect for providing electric energy.

In some embodiments, the electrical apparatus is a vehicle, a ship or a spacecraft.

In a third aspect, there is provided a method for making a battery, comprising: providing a battery cell; providing a first component, wherein a first surface of the first component is connected to at least one of the battery cells through an adhesion member, the adhesion member comprises a first adhesion structure and a second adhesion structure, the first adhesion structure is located at the periphery of the second adhesion structure, and the first adhesion structure has an elongation at break greater than that of the second adhesion structure.

In a fourth aspect, there is provided an apparatus for making a battery, comprising a module for performing the method of the third aspect above.

Figure 1:
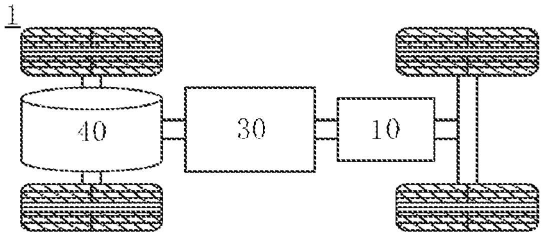
FIG. 1 is a schematic structural view of a vehicle as disclosed in an embodiment of the present application.

In the drawings, the drawings are not drawn to actual scale.

DETAILED DESCRIPTION

Implementation of the present application will be described in further detail below in connection with the drawings and embodiments. The following detailed description of the embodiments and the drawings are used to illustrate the principles of the present application exemplarily, but are not intended to limit the scope of the present application, that is, the present application is not limited to the described embodiments.

In the description of the present application, it should be noted that, unless otherwise stated, "plurality of" means two or more; the orientations or positional relationships indicated by the terms "upper", "lower", "left", "right", "inner" and "outer" are only for facilitating the description of the present application and simplifying the description, rather than indicating or implying that the apparatus or element referred to must have a particular orientation or be constructed and operated in a particular orientation, and therefore should not be construed as limiting the present application. In addition, the terms "first", "second", "third", and the like are used for descriptive purposes only, and cannot be construed as indicating or implying relative importance. "Perpendicular" is not strictly perpendicular, but within an allowable range of errors. "Parallel" is not strictly parallel, but within an allowable range of errors.

The orientation words appearing in the following description are all the directions shown in the drawings, and do not limit the specific structure of the present application. In the description of the present application, it is also to be noted that, unless otherwise expressly specified and restricted, the terms "installed", "linked" and "connected" should be understood in a broad sense, for example, as a fixed connection, or as a detachable connection, or as an integral connection; alternatively as a direct connection or as an indirect connection through an intermediate medium. For those of ordinary skill in the art, the specific meanings of the above terms in the present application can be understood according to specific situations.

In the present application, the battery cell may include a primary battery and a secondary battery, for example, it may be a lithium-ion battery, a lithium-sulfur batter, a sodium/lithium-ion battery, a sodium-ion battery, a magnesium-ion battery, or the like, which are not limited in the embodiments of the present application. The battery cell may have a shape of cylinder, flat body, rectangular parallelepiped or other shapes, which are not limited either in the embodiments of the present application. Battery cells are generally divided into three types according to the encapsulating mode: cylindrical battery cells, square battery cells and soft pack battery cells, which are not limited either in the embodiments of the present application.

The battery mentioned in the embodiments of the present application refers to a single physical module comprising one or more battery cells for providing higher voltage and capacity. For example, the battery mentioned in the present application may include a battery module or a battery pack, etc. A battery pack generally comprises a box body for encapsulating one or more battery cells. The box body can prevent liquids or other foreign matters from affecting the charging or discharging of the battery cell.

The battery cell comprises an electrode assembly and an electrolyte solution, and the electrode assembly comprises a positive electrode sheet, a negative electrode sheet and a separator. The battery cell mainly relies on the movement of metal ions between the positive electrode sheet and the negative electrode sheet to work. The positive electrode sheet comprises a positive electrode current collector and a positive electrode active material layer, wherein the positive electrode active material layer is coated on the surface of the positive electrode current collector, the portion of the current collector not coated with the positive electrode active material layer protrudes from the portion of the current collector already coated with the positive electrode active material layer, and the portion of the current collector not coated with the positive electrode active material layer serves as a positive tab. Taking a lithium-ion battery as an example, the material of the positive electrode current collector may be aluminum, and the positive electrode active material may be lithium cobalt oxide, lithium iron phosphate, ternary lithium, lithium manganate, or the like. The negative electrode sheet comprises a negative electrode current collector and a negative electrode active material layer, wherein the negative electrode active material layer is coated on the surface of the negative electrode current collector, the portion of the current collector not coated with the negative electrode active material layer protrudes from the portion of the current collector already coated with the negative electrode active material layer, and the portion of the current collector not coated with the negative electrode active material layer serves as a negative tab. The material of the negative electrode current collector may be copper, and the negative electrode active material may be carbon, silicon, or the like. In order to ensure that a large current is passed without fusing, there are a plurality of positive tabs which are laminated together, and there are a plurality of negative tabs which are laminated together. The material of the separator may be PP, PE, or the like. In addition, the electrode assembly may have a wound structure or a laminated structure, which are not limited in the embodiments of the present application.

Additionally, in order to improve the safety performance of the battery cell, a pressure relief mechanism is generally also provided for the battery cell. The pressure relief mechanism refers to an element or component that is actuated to relieve an internal pressure or temperature of the battery cell when the internal pressure or temperature reaches a predetermined threshold. The predetermined threshold can be adjusted depending on the design requirements. The predetermined threshold may depend on the materials of one or more of the positive electrode sheet, the negative electrode sheet, the electrolyte solution and the separator in the battery cell. The pressure relief mechanism may use such elements or components that are sensitive to pressure or temperature, that is, when the internal pressure or temperature of the battery cell reaches a predetermined threshold, the pressure relief mechanism is actuated, thus forming a passage through which the internal pressure or temperature can be relieved.

The development of battery technology should consider various design factors at the same time, for example, energy density, cycling life, discharge capacity, charge/discharge rate, and other performance parameters, in addition to the safety of the battery.

The safety of the battery includes many aspects, among which, in the aspect of securing the battery cells, in order to improve the stability and safety of the battery cells within the battery, a plurality of battery cells are generally fixedly installed within the box body through an adhesion structure. Taking an example of using a structural glue between the battery cell and a certain surface of the box body, and fixing the battery cell within the box body by gluing, two types of structural glue are usually included in selection. One is to use a “high-strength glue”, which has high bonding strength and is firmly bonded to the box body, and a synchronous deformation of the box body and the battery cell can be realized through the high strength of the “high-strength glue”; however, during the use of the battery cell, the battery cell may expand and deform, and this “high-strength glue” solution is limited by the strength of the glue; after the expansion and deformation of the battery cell, the edge thereof is likely to have a risk of unbonding, and the high-strength glue also has a risk of unbonding under the impact of low temperature vibration. The other is to use a “high-elastic glue”, which has high elasticity, high elongation and strong glue deformability, and can be extended along with deformation, thereby realizing synchronous deformation between the box body and the battery cell through the deformation of the glue; however, this “high-elastic glue” solution has a lower relative strength due to the high glue elongation, resulting in that the overall stiffness of the battery is lower, the structure is unstable, and during the use of the battery, the stability between the battery cell and the box body is not enough, and there is a risk of structural failure.

Therefore, the battery monomer stable with the case, the adhesion member provided on the surface of the battery cell in the embodiments of the present application comprises two adhesion structures, wherein the first adhesion structure is located at the periphery of the second adhesion structure, and the elongation at break of the first adhesion structure is greater than the elongation at break of the second adhesion structure, so that the overall stiffness and stability of the battery cell within the battery can be ensured, and there is no unbonding due to the expansion and deformation of the battery cell, thereby avoiding the battery failure due to vibration impact after unbonding.

The technical solutions described in the embodiments of the present application are applicable to various apparatuses using batteries, such as a mobile phone, a portable device, a laptop, a battery car, an electric toy, an electric tool, an electric vehicle, a ship, a spacecraft, and the like, for example, the spacecraft includes an airplane, a rocket, a space shuttle, a spaceship, and the like.

It should be understood that the technical solutions described in the embodiments of the present application are applicable not only to the above-mentioned devices, but also to all devices using batteries; however, for the sake of simplicity of description, the following embodiments are all illustrated with electric vehicles as examples.

For example, as shown in FIG. 1, which is a schematic structural view of a vehicle 1 according to an embodiment of the present application, in which the vehicle 1 may be a fuel vehicle, a gas vehicle or a new energy vehicle, and the new energy vehicle may be an all-electric vehicle, a hybrid vehicle, an extended range vehicle, or the like. The interior of the vehicle 1 can be provided with a motor 40, a controller 30 and a battery 10, wherein the controller 30 is used for controlling the battery 10 to power the motor 40. For example, the battery 10 can be provided at the bottom or the head or the rear of the vehicle 1. The battery 10 can be used to power the vehicle 1, for example, the battery 10 can be used as an operating power source of the vehicle 1, for the circuit system of the vehicle 1, e.g. for the operating power demand of the vehicle 1 during start-up, navigation and driving. In another embodiment of the present application, the battery 10 can be used not only as the operating power source for the vehicle 1, but also as a driving power source for the vehicle 1 to replace or partially replace fuel or natural gas to provide driving power for the vehicle 1.

In order to meet different power demands, the battery can comprise a plurality of battery cells, wherein the plurality of battery cells can be connected in series or in parallel or in parallel-series connection, and the parallel-series connection refers to the mixing of series connection and parallel connection. The battery may also be referred to as a battery pack. In some embodiments, a plurality of battery cells can first be connected in series or in parallel or in parallel-series connection to form a battery module, and then a plurality of battery modules are connected in series or in parallel or in parallel-series connection to form a battery. That is to say, a plurality of battery cells can directly form a battery, or they can form battery modules first, and then the battery modules form a battery.

Figure 2:
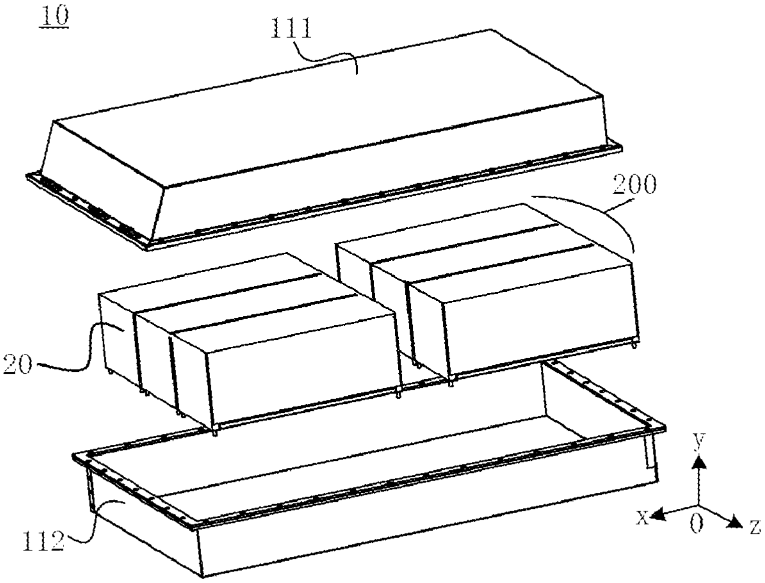
FIG. 2 is an exploded schematic structural view of a battery as disclosed in an embodiment of the present application.

For example, as shown in FIG. 2, which is a schematic structural view of a battery 10 according to an embodiment of the present application, in which the battery 10 may comprise at least one battery module 200. The battery module 200 comprises a plurality of battery cells 20. The battery 10 may further comprise a box body, the inside of which is a hollow structure, and a plurality of battery cells 20 are accommodated within the box body. As shown in FIG. 2, the box body may comprise two portions, referred to herein as a first box body 111 and a second box body 112, respectively, and the first box body 111 and the second box body 112 are snap-fitted together. The shapes of the first box body 111 and the second box body 112 may depend on the shape of the combination of the battery modules 200, and at least one of the first box body 111 and the second box body 112 has an opening. For example, as shown in FIG. 2, both the first box body 111 and the second box body 112 may be a hollow rectangular parallelepiped, and each has only one surface provided with an opening, the opening of the first box body 111 and the open of the second box body 112 are oppositely provided, and the first box body 111 and the second box body 112 are mutually snap-fitted to form the box body with an enclosed cavity. For another example, unlike shown in FIG. 2, only one of the first box body 111 and the second box body 112 may be a hollow rectangular parallelepiped having an opening, and the other may be plate-shaped to cover the opening. For example, here, taking as an example that the second box body 112 is a hollow rectangular parallelepiped with only one surface provided with an opening and the first box body 111 is plate-shaped, the first box body 111 covers the opening of the second box body 112 to form the box body with an enclosed cavity, which can be used for accommodating the plurality of battery cells 20. The plurality of battery cells 20 are combined each other by parallel connection or series connection or parallel-series connection, and then placed into the box body formed by the snap-fitting of the first box body 111 and the second box body 112.

In some embodiments, the battery 10 may further comprise other structures, which will not be repeated here. For example, the battery 10 may further comprise a bus member for electrically connecting the plurality of battery cells 20, such as in parallel or in series or in parallel-series connection. Specifically, the bus member can electrically connect the battery cells 20 by connecting the electrode terminals of the battery cells 20. Further, the bus member can be fixed to the electrode terminals of the battery cells 20 by welding. The electric energy of the plurality of battery cells 20 can further be extracted by passing a conductive mechanism through the box body.

The number of battery cells 20 in the battery module 200 can be set to any numerical value according to different power demands. The plurality of battery cells 20 can be connected in series, in parallel, or in parallel-series connection to achieve a larger capacity or power. Since the number of battery cells 20 comprised in each battery 10 may be large, for convenience of installation, the battery cells 20 are arranged in groups, and each group of battery cells 20 constitutes a battery module 200. The number of the battery cells 20 comprised in the battery module 200 is not limited, and can be set as required.

Figure 3:
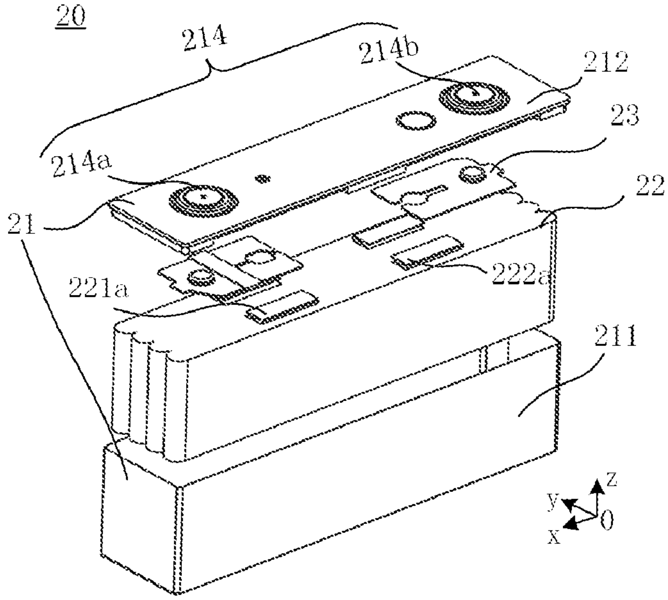
FIG. 3 is an exploded schematic structural view of a battery cell as disclosed in an embodiment of the present application.

FIG. 3 is a schematic structural view of a battery cell 20 according to an embodiment of the present application, in which the battery cell 20 comprises one or more electrode assemblies 22, a case 211 and a cover plate 212. The case 211 and the cover plate 212 form a shell 21. The wall of the case 211 and the cover plate 212 are both referred to as the wall of the battery cell 20. The case 211 depends on the shape of the combination of the one or more electrode assemblies 22, for example, the case 211 may be a hollow rectangular parallelepiped or cube or cylinder, and one of the surfaces of the case 211 has an opening, so that the one or more electrode assemblies 22 can be placed into the case 211. For example, when the case 211 is a hollow rectangular parallelepiped or cube, one of the planes of the case 211 is provided with an opening, that is, the plane has no wall body, so that the inside and outside of the case 211 are inter-communicated. When the case 211 can be a hollow cylinder, the end surface of the case 211 is provided with an opening, that is, the end surface has no wall body, so that the inside and outside of the case 211 are inter-communicated. The cover plate 212 covers the opening, and is connected to the case 211 to form an enclosed cavity in which the electrode assembly 22 is placed. The case 211 is filled with an electrolyte, such as an electrolyte solution.

The battery cell 20 may further comprise two electrode terminals 214, which can be provided on the cover plate 212. The cover plate 212 is generally in the shape of a flat plate, the two electrode terminals 214 are fixed on the flat plate surface of the cover plate 212, and the two electrode terminals 214 are a first electrode terminal 214*a* and a second electrode terminal 214*b*, respectively. The two electrode terminals 214 are opposite in polarity. For example, when the first electrode terminal 214*a* is a positive electrode terminal, the second electrode terminal 214*b* is a negative electrode terminal. Each electrode terminal 214 is respectively provided with a corresponding connection member 23, which is located between the cover plate 212 and the electrode assembly 22, for electrically connecting the electrode assembly 22 to the electrode terminal 214.

As shown in FIG. 3, each electrode assembly 22 has a first electrode tab 221*a* and a second electrode tab 222*a*. The first electrode tab 221*a* and the second electrode tab 222*a* are opposite in polarity. For example, when the first electrode tab 221*a* is a positive tab, the second electrode tab 222*a* is a negative tab. The first electrode tab 221*a* of the one or more electrode assemblies 22 is connected to one electrode terminal through one connection member 23, and the second electrode tab 222*a* of the one or more electrode assemblies 22 is connected to the other electrode terminal through the other connection member 23. For example, the positive electrode terminal 214*a* is connected to the positive tab through one connection member 23, and the negative electrode terminal 214*b* is connected to the negative tab through the other connection member 23.

In the battery cell 20, according to the actual use requirements, one or more electrode assemblies 22 can be provided; as shown in FIG. 3, four independent electrode assemblies 22 are provided within the battery cell 20.

In addition, in order to improve the safety of the battery cell 20, a pressure relief mechanism can be provided on one wall of the battery cell 20, for example, a pressure relief mechanism can be provided on a first wall of the battery cell 20, wherein the first wall may be any wall of the battery cell 20. The pressure relief mechanism is used to actuate when an internal pressure or temperature of the battery cell 20 reaches a threshold to relieve the internal pressure or temperature. Specifically, when too much gas generated in the battery cell 20 causes the internal pressure of the case 211 to rise and reach a threshold or the heat generated by the internal reaction in the battery cell 20 causes the internal temperature of the battery cell 20 to rise and reach a threshold, the pressure relief mechanism may rupture to cause the inside and outside of the case 211 to be intercommunicated, and the gas pressure and temperature are released to the outside through the rupture of the pressure relief mechanism, thus preventing the explosion of the battery cell 20.

In the embodiments of the present application, the battery cell 20 needs to be fixed within the box body, for example, taking as an example that a structural glue is provided on the surface of the battery cell 20 to fix the battery cell 20, two types of structural glue are usually included in selection. One is to use a “high-strength glue”, which has high bonding strength, so that the battery cell 20 is firmly bonded to the box body, and a synchronous deformation of the box body and the battery cell 20 can be realized through the high strength of the “high-strength glue”; however, during the use of the battery cell 20, the battery cell 20 may expand and deform, and this “high-strength glue” solution is limited by the strength of the glue; after the expansion and deformation of the battery cell 20, the edge thereof is likely to have a risk of unbonding, and the high-strength glue also has a risk of unbonding under the impact of low temperature vibration. The other is to use a “high-elastic glue”, which has high elasticity, high elongation and strong glue deformability, and can be extended along with deformation, thereby realizing synchronous deformation between the box body and the battery cell 20 through the deformation of the glue; however, this “high-elastic glue” solution has a lower relative strength due to the high glue elongation, resulting in that the overall stiffness of the battery 10 is lower, the structure is unstable, and during the use of the battery 10, the stability between the battery cell 20 and the box body is not enough, and there is a risk of structural failure.

Therefore, the embodiments of the present application provide a battery capable of solving the above-mentioned problems.

Figure 4:
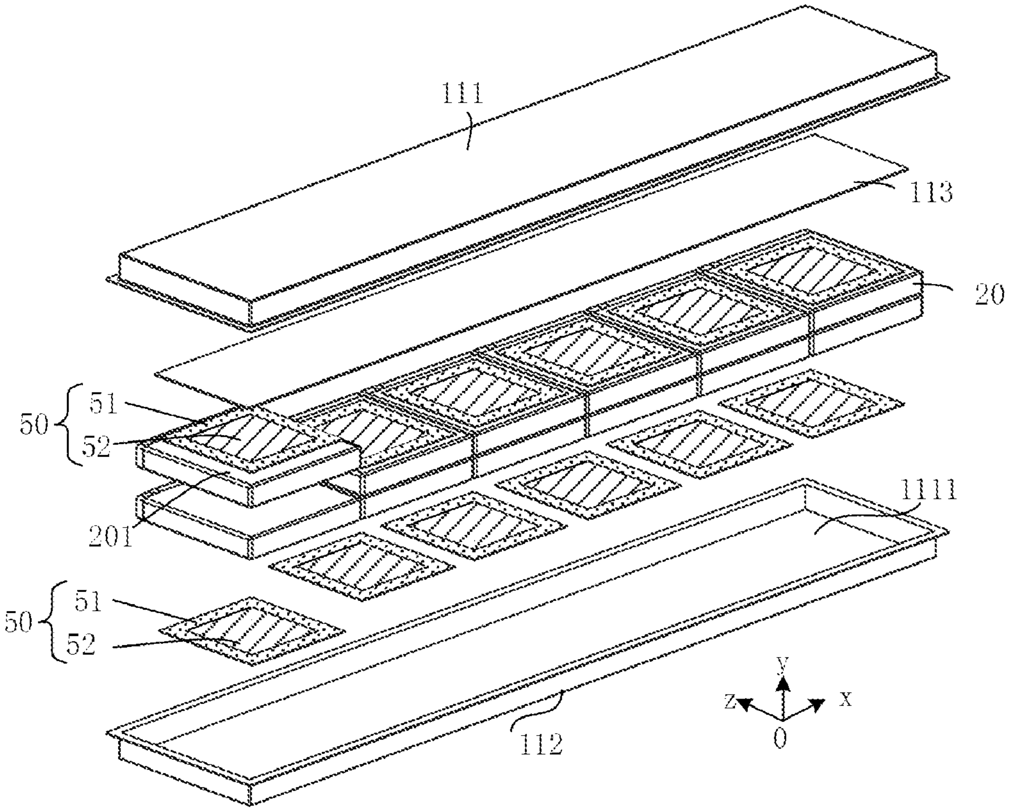
FIG. 4 is an exploded schematic structural view of another battery as disclosed in an embodiment of the present application.
Figure 5:
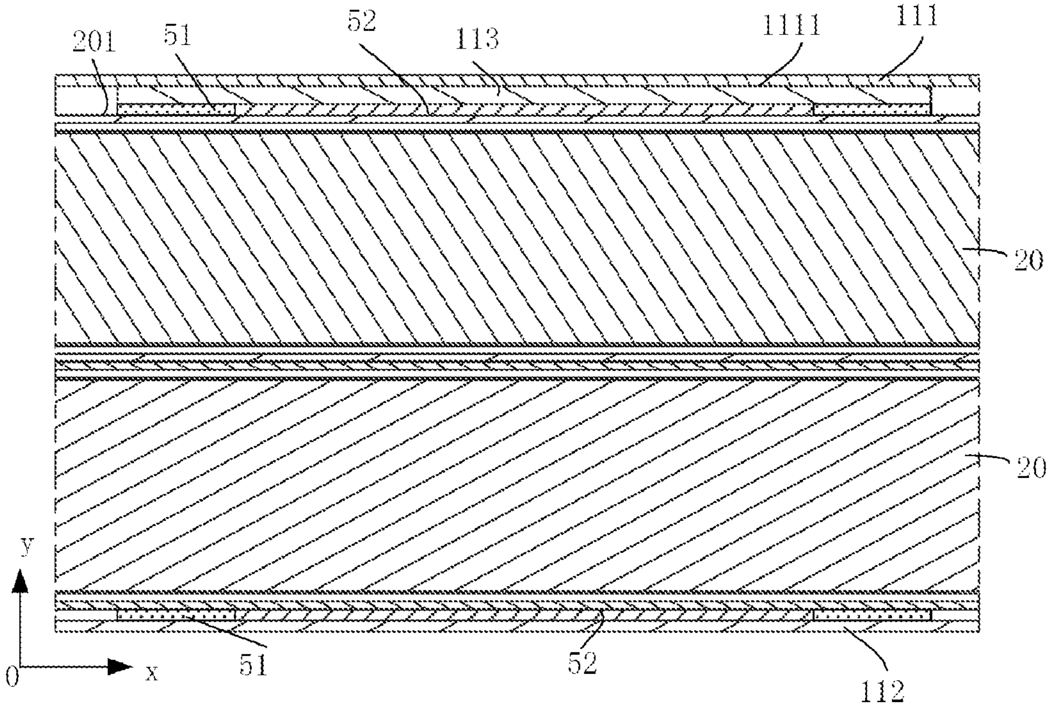
FIG. 5 is a partial cross-sectional view of the battery shown in FIG. 4.
Figure 6:
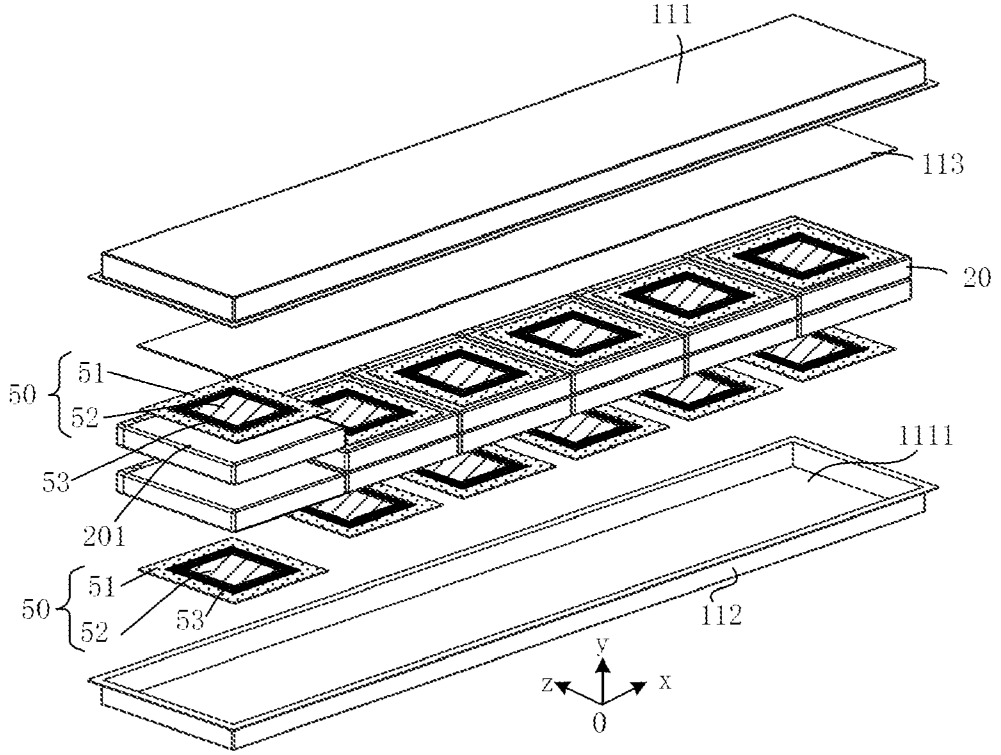
FIG. 6 is an exploded schematic structural view of yet another battery as disclosed in an embodiment of the present application.
Figure 7:
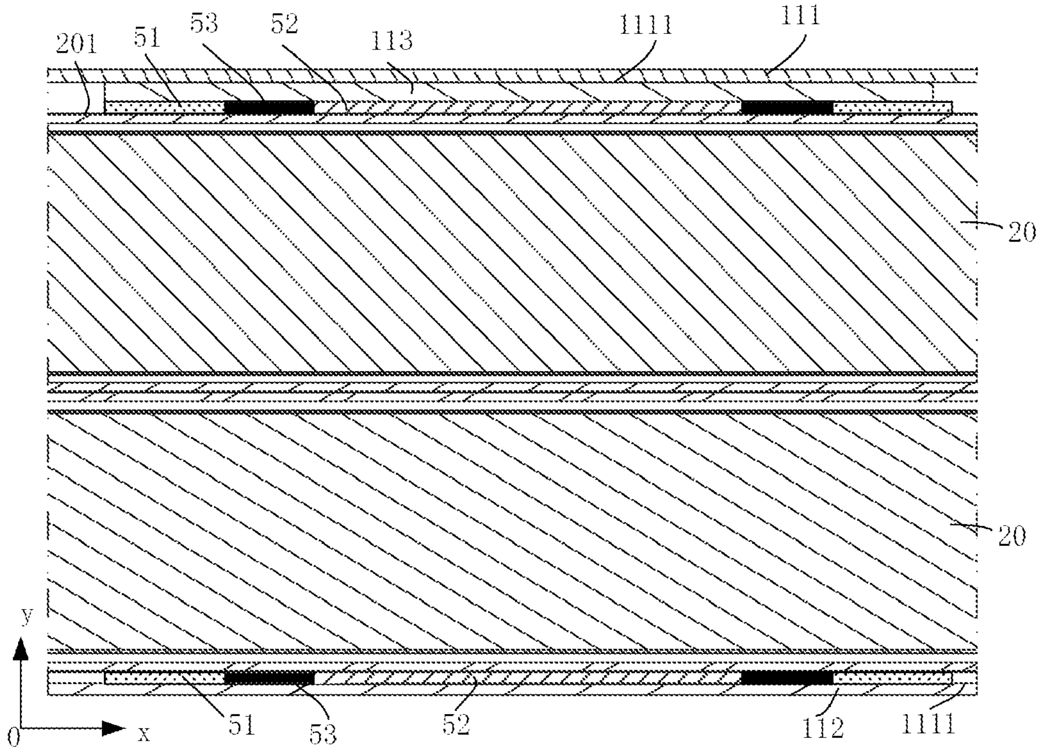
FIG. 7 is a partial cross-sectional view of the battery shown in FIG. 6.

FIG. 4 and FIG. 6 show exploded schematic views of a battery 10 according to different embodiments of the present application, respectively, and correspondingly, FIG. 5 is a partial cross-sectional view of the battery 10 shown in FIG. 4, and FIG. 7 is a partial cross-sectional view of the battery 10 shown in FIG. 6. As shown in FIG. 4 to FIG. 7, the battery 10 comprises: a battery cell 20 and a first component, wherein a first surface 1111 of the first component is connected to at least one battery cell 20 through an adhesion member 50, the adhesion member 50 comprises a first adhesion structure 51 and a second adhesion structure 52, the first adhesion structure 51 is located at the periphery of the second adhesion structure 52, and the first adhesion structure 51 has an elongation at break greater than that of the second adhesion structure 52.

Therefore, in the battery 10 according to the embodiments of the present application, the adhesion member 50 comprising two adhesion structures is provided between the battery cell 20 and the first component to fix the battery cell 20, wherein the first component may comprise a box body of the battery 10 or an upper cover 113 within the box body, so that the first adhesion structure 51 with a higher elongation at break is located at the periphery of the second adhesion structure 52 with a lower elongation at break, so that after the expansion and deformation of the battery cell 20, the edge position is the first adhesion structure 51 with high elongation at break, which is able to maintain the connection between the battery cell 20 and the upper cover 113 or between the battery cell 20 and the box body fixed, thus improving the stability of the battery cell 20 within the battery 10, and in turn improving the safety of the battery 10.

It should be understood that in the embodiments of the present application, providing the first adhesion structure 51 at the periphery of the second adhesion structure 52 may comprise: the first adhesion structure 51 surrounding the periphery of the second adhesion structure 52, or the first adhesion structure 51 being provided in a local region around the second adhesion structure 52 and not completely surrounding the second adhesion structure 52, and the embodiments of the present application are not limited thereto. For convenience of illustration, the embodiments of the present application are mainly described with the first adhesion structure 51 surrounding the second adhesion structure 52 as an example.

Moreover, the shape of the second adhesion structure 52 in the embodiments of the present application can be set according to the actual application, for example, the second adhesion structure 52 may be rectangular or circular; and correspondingly, the shape of the first adhesion structure 51 can also be set according to the actual application, for example, the first adhesion structure 52 can be set as a square ring or a circular ring, and the embodiments of the present application are not limited thereto. For convenience of illustration, the embodiments of the present application are mainly described with the first adhesion structure 51 being a square ring and the second adhesion structure 52 being square as an example.

It should be understood that the first surface of the first component of the embodiments of the present application may refer to any surface of the first component that is connected to the battery cell 20, and the first component may comprise one or more first surfaces 1111. Specifically, the first component may comprise the box body, which may comprise a first box body 111 and a second box body 112, and the first surface 1111 may be any surface of the first box body 111 or the second box body 112; and in some embodiments, the first component may further comprise the upper cover 113, and the first surface 1111 may also be a surface of the upper cover 113.

In some embodiments, as shown in FIG. 4 to FIG. 7, if the upper cover 113 is comprised in the battery 10, the upper cover 113 is generally provided between the battery cell 20 and the box body, for example, FIG. 4 to FIG. 7 take as an example that the upper cover 113 is provided between the battery cell 20 and the first box body 111 of the box body, the battery cell 20 within the battery 10 can be connected and fixed to the upper cover 113 through the adhesion member 50, that is, the surface of the upper cover 113 facing the battery cell 20 is the first surface 1111; Additionally, for the side not provided with the upper cover 113 within the box body, for example between the battery cell 20 and the second box body 112 in FIG. 4 to FIG. 7, the battery cell 20 can also be directly fixed to the surface of the second box body 112 of the box body through the adhesion member 50, for example as shown in FIG. 4 to FIG. 7, the battery cell 20 can be connected and fixed to the second box body 112, that is, the second box body 112 can also have the first surface 1111.

In some embodiments, if the upper cover 113 is not comprised in the battery 10, the battery cell 20 can be fixed and connected to the first box body 111 through the adhesion member 50, that is, the first box body 111 has the first surface 1111; and moreover, the adhesion member 50 can also be provided between the battery cell 10 and the second box body 112, that is, the second box body 112 may also have the first surface 1111, but the embodiments of the present application are not limited thereto.

It should be understood that for convenience of description, the drawings of the present application take as an example that the battery 10 has the upper cover 113 and take as an example that the first surface 1111 comprises an inner surface of the second box body 112 shown in FIG. 4 to FIG. 7 as well as a surface of the upper cover 113 facing the battery cell 20, that is, the surface of the second box body 112 facing the battery cell 20 with the largest area is the first surface 1111, and the surface of the upper cover facing the battery cell 20 is also the first surface 1111, but the embodiments of the present application are not limited thereto.

It should be understood that the battery 10 in the embodiments of the present application may comprise a plurality of battery cells 20, and the provision direction of each battery cell 20 in the plurality of battery cells 20 can be flexibly set according to the actual application. Specifically, a rectangular parallelepiped battery cell 20 as shown in FIG. 3 is described here as an example, and when such a plurality of battery cells 20 are fixedly installed within the box body, each battery cell 20 can be provided within the box body in the same direction.

As shown in FIG. 4 to FIG. 7, the battery 10 may comprise a plurality of battery cell groups arranged in a first direction Y which is perpendicular to the first surface 1111, that is, the battery cells 20 within the battery 10 can be provided in one or more layers, and the battery cells 20 in each layer constitute a battery cell group, for example, there are two layers in FIG. 4 to FIG. 7 as an example, that is, two battery cell groups are included. Each battery cell group in the plurality of battery cell groups comprises at least two battery cells 20 arranged in a second direction X which is perpendicular to the first direction Y, for example, FIG. 4 to FIG. 7 take as an example that each battery cell group comprises 6 battery cells 20 arranged in the X direction; and moreover, a case where only one row of battery cells are comprised in each battery cell group as shown in FIG. 4 to FIG. 7 is described herein as an example, but each battery cell group included in the battery 10 may also comprise multiple rows of battery cells, and each row of battery cells comprise at least two battery cells 20 arranged in the second direction X, and the embodiments of the present application are not limited thereto.

In the embodiments of the present application, the adhesion member 50 is provided between the first battery cell group in the plurality of battery cell groups and the first surface 1111, that is, the adhesion member 50 is provided between a second surface 201 of the battery cell 20 in the first battery cell group and the first surface 1111. Specifically, the plurality of battery cell groups may comprise one or more first battery cell groups. For example, as shown in FIG. 4 to FIG. 7, the battery cell group located at the uppermost layer in the plurality of battery cell groups can be connected and fixed to the first surface 1111 of the upper cover 113; therefore, the battery cell group located at the uppermost layer can be a first battery cell group, that is, the upper surface of the battery cell 20 within the uppermost first battery cell group is a second surface 201, and the adhesion member 50 is provided between the second surface 201 and the first surface 1111; similarly, as shown in FIG. 4 to FIG. 7, the battery cell group located at the lowermost layer in the plurality of battery cell groups can be connected and fixed to the first surface 1111 of the second box body 112, and therefore, the battery cell group located at the lowermost layer may also be the first battery cell group, that is, the lower surface of the battery cell 20 of the lower first battery cell group may also be the second surface 201, and the adhesion member 50 is provided between the second surface 201 and the first surface 1111 of the second box body 112.

It should be understood that the battery cell 20 in the embodiments of the present application is a rectangular parallelepiped, and the adhesion member 50 is provided between the second surface 201 of the battery cell 20 in the first battery cell group and the first surface 1111, wherein the second surface 201 may be one surface of each battery cell 20 with the largest surface area, so as to increase the bonding area between the adhesion member 50 and the battery cell 20, and improve the bonding strength between the two. For example, as shown in FIG. 4 to FIG. 7, the rectangular battery cell 20 has six side walls, wherein the case 211 has two side walls with a larger area, and the side wall can form the second surface 201 provided with the adhesion member 50, and such provision of the battery cell 20 may be more beneficial to the heat dissipation of the battery cell 20.

In the embodiments of the present application, one or more adhesion members 50 can be provided between the first battery cell group and the first surface 1111. For convenience of description, the adhesion member 50 according to the embodiments of the present application will be described in detail below in connection with the accompanying drawings, taking as an example that a plurality of adhesion members 50 are provided between the first battery cell group and the first surface 1111.

In some embodiments, as an embodiment, a plurality of adhesion members 50 can be provided between the first battery cell group and the first surface 1111, for example, as shown in FIG. 4 to FIG. 7, the plurality of adhesion members 50 are in one-to-one correspondence with the battery cells 20 in the first battery cell group.

Figure 8:
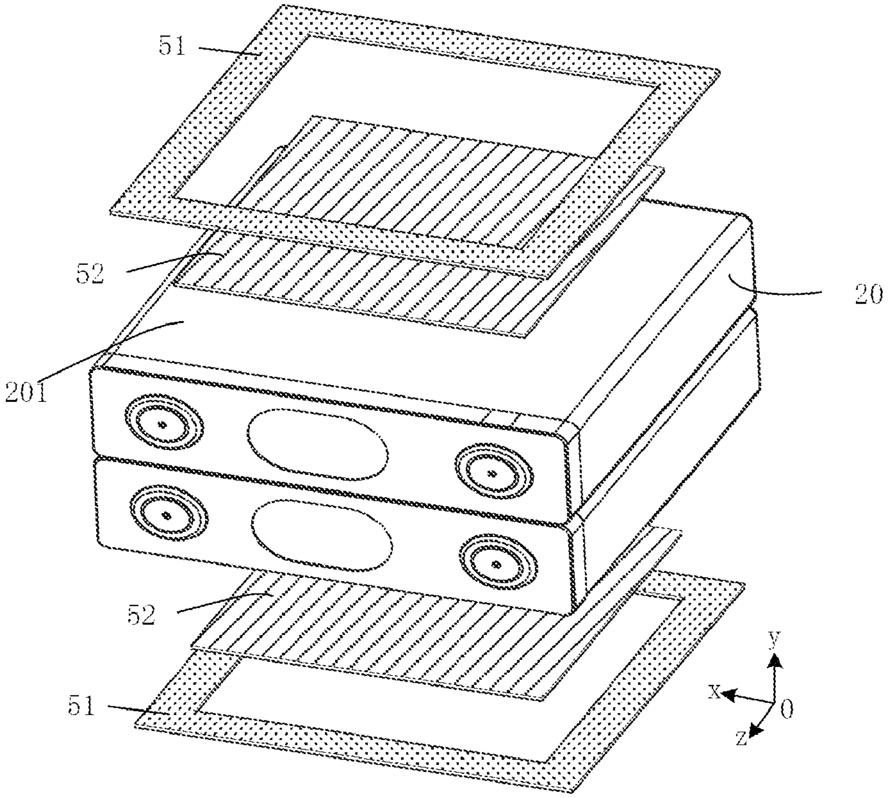
FIG. 8 is an exploded schematic structural view of a battery cell and an adhesion member as disclosed in an embodiment of the present application.
Figure 9:
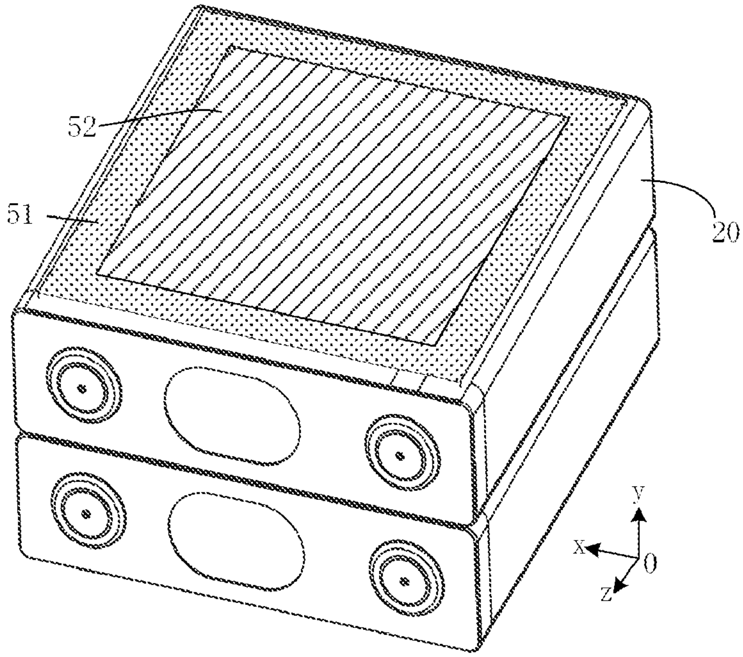
FIG. 9 is a schematic view of a battery cell provided with an adhesion member as disclosed in an embodiment of the present application.
Figure 10:
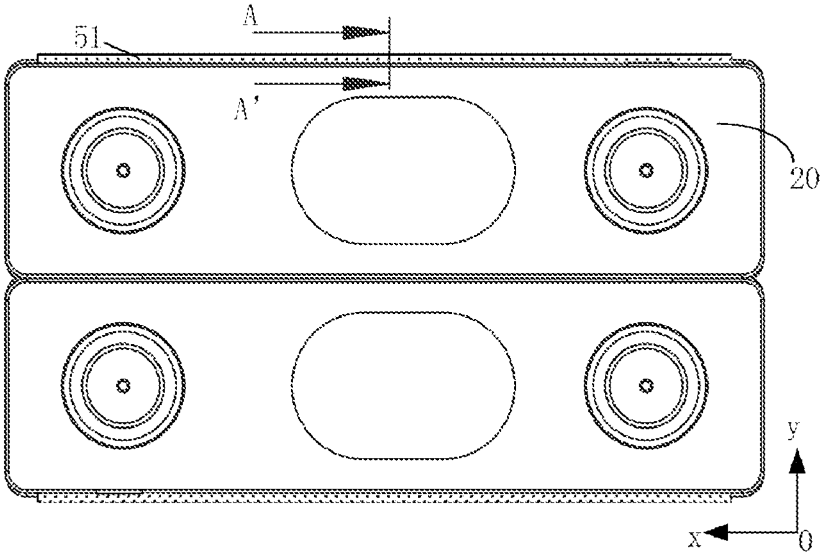
FIG. 10 is a side view of a battery cell provided with an adhesion member when expanding as disclosed in an embodiment of the present application.
Figure 11:
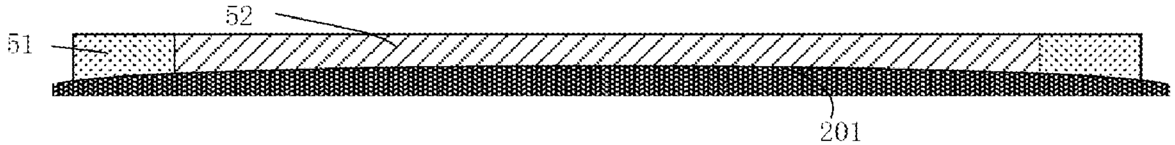
FIG. 11 is a partial cross-sectional view in the direction A-A' shown in FIG. 8.

Corresponding to FIG. 4 and FIG. 5, FIG. 8 shows an exploded schematic view of the battery cell 20 and the adhesion member 50 in FIG. 4 and FIG. 5, FIG. 9 shows a schematic view in which the adhesion member 50 is provided on the surface of the battery cell 20, FIG. 10 is a side view of the battery cell 20 provided with the adhesion member 50 on the surface thereof when expanding, and FIG. 11 is a partial cross-sectional view in the A-A' direction shown in FIG. 10. As shown in FIG. 8 to FIG. 11, the second surface 201 of one battery cell 20 is provided with one adhesion member 50 comprising a first adhesion structure 51 and a second adhesion structure 52, and the first adhesion structure 51 is provided at the periphery of the second adhesion structure 52. In this way, the stability of each battery cell 20 can be better ensured when the battery cell 20 expands and deforms.

It should be understood that the adhesion member 50 may be located in any region of the second surface 201 of one battery cell 20. For example, as shown in FIG. 8 to FIG. 11, the adhesion member 50 may almost completely cover the second surface 201 of the battery cell 20; alternatively, the adhesion member 50 may occupy a local region of the second surface 201. Moreover, as shown in FIG. 11, considering that after the expansion and deformation of the battery cell 20, the deformation amount of the central region of the second surface 201 of the battery cell 20 is larger, whereas the deformation amount of the edge region is smaller, that is to say, the distance from the central position of the battery cell 20 to the first surface 1111 is less than the distance from the edge region to the first surface 1111; therefore, the second adhesion structure 52 with a smaller elongation at break and a higher strength can be provided at the central position of each battery cell 20, that is, the second adhesion structure 52 covers the central point of the battery cell 20, so that the first adhesion structure 51 is located at the edge position all around the second surface 201, wherein the central region or central position of the second surface 201 of the battery cell 20 comprises the central point of the second surface 201 of the battery cell 20. In this way, the second adhesion structure 52 at the central position of the battery cell 20 can ensure the relative stability between the battery cell 20 and the first surface 1111, and the relatively large elongation at break of the first adhesion structure 51 at the edge all around each battery cell 20 can ensure that there is no unbonding between the edge all around each battery cell 20 and the first surface 1111.

In some embodiments, the area of the second surface 201 of one battery cell 20 is denoted as S0, and correspondingly, the contact area of the first adhesion structure 51 with the second surface 201 is denoted as S1 (correspondingly, the contact area of the first adhesion structure 51 with the first surface 1111 can also be denoted as S1), and the contact area of the second adhesion structure 52 with the second surface 201 is denoted as S2 (correspondingly, the contact area of the second adhesion structure 52 with the first surface 1111 can also be denoted as S2), then S0, S1 and S2 can be set to satisfy: $0.25 \le (S1+S2)/S0 < 1$. For example, S0, S1 and S2 can be set to satisfy: $0.5 \le (S1+S2)/S0 \le 0.85$. Further, S1 and S2 can also be set to satisfy: $0.05 \le S1/(S1+S2) \le 0.85$, for example, S1 and S2 can be set to satisfy: $0.15 \le S1/(S1+S2) \le 0.55$.

In some embodiments, the first adhesion structure 51 surrounds the periphery of the second adhesion structure 52 in FIG. 8 to FIG. 11; however, considering that the first adhesion structure 51 and the second adhesion structure 52 are of different materials, therefore as shown in FIG. 6 and FIG. 7, a blocking member 53 may further be provided between the first adhesion structure 51 and the second adhesion structure 52 to avoid the mutual influence between the first adhesion structure 51 and the second adhesion structure 52.

Figure 12:
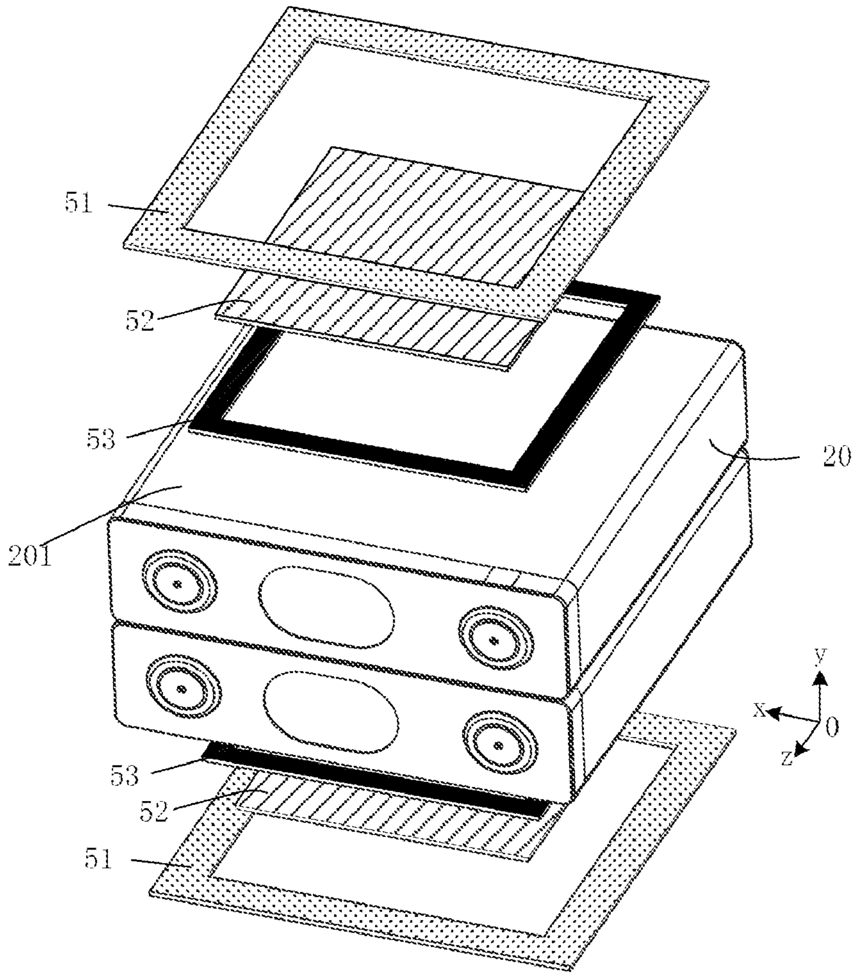
FIG. 12 is an exploded schematic structural view of another battery cell and an adhesion member as disclosed in an embodiment of the present application.
Figure 13:
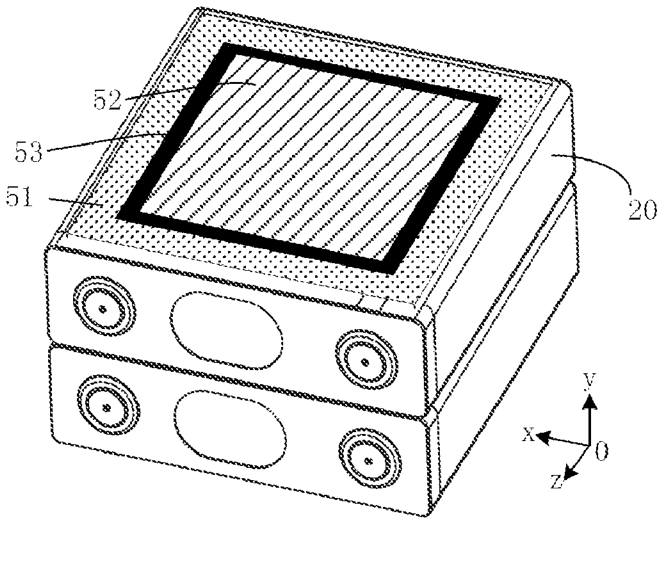
FIG. 13 is a schematic view of another battery cell provided with an adhesion member when expanding as disclosed in an embodiment of the present application.
Figure 14:
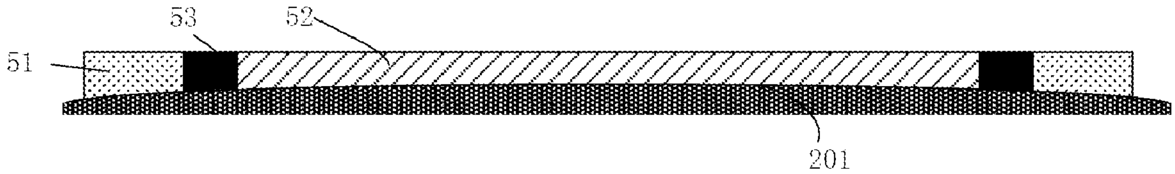
FIG. 14 is another partial cross-sectional view in the direction A-A' shown in FIG. 8.

Corresponding to FIG. 6 and FIG. 7, FIG. 12 shows another exploded schematic view of the battery cell 20 and the adhesion member 50 in FIG. 6 and FIG. 7, and correspondingly, FIG. 13 shows another schematic view when the adhesion member 50 is provided on the surface of the battery cell 20 and the battery cell expands; moreover, for the battery cell 20 shown in FIG. 12 and FIG. 13, the side view thereof can still be as shown in FIG. 10, and the corresponding partial cross-sectional view in the A-A' direction is as shown in FIG. 14. As shown in FIG. 12 to FIG. 14, the second surface 201 of one battery cell 20 is provided with one adhesion member 50 comprising a first adhesion structure 51 and a second adhesion structure 52, and additionally, a blocking member 53 is provided between the first adhesion structure 51 and the second adhesion structure 52.

In some embodiments, the blocking member 53 may be a foam, a plastic part, or the like to block the mutual influence between the first adhesion structure 51 and the second adhesion structure 52. Moreover, the shape of the blocking member 53 can be set according to the actual application. For example, depending on the shapes of the first adhesion structure 51 and the second adhesion structure 52, the shape of the blocking member 53 can be correspondingly set, for example, the blocking member 53 is a square ring in FIG. 12 to FIG. 14 as an example.

In some embodiments, to avoid the mutual influence between the first adhesion structure 51 and the second adhesion structure 52, where the blocking member 53 is not provided, a gap may then be provided between the first adhesion structure 51 and the second adhesion structure 52, so that no additional components are needed, and the setting method is relatively simple. For example, the position in FIG. 12 to FIG. 14 where the blocking member 53 is provided is instead provided with a gap, which can also avoid the mutual influence between the first adhesion structure 51 and the second adhesion structure 52, and the embodiments of the present application are not limited thereto.

It should be understood that in the presence of the blocking member 53 or the gap, the ratio of the first adhesion structure 51 to the second adhesion structure 52 can still be assigned according to the relationship satisfied by S0, S1 and S2 described above, which will not be repeated here.

For each of the embodiments in FIG. 4 to FIG. 14 above, by the area ratio of the first adhesion structure 51 to the second adhesion structure 52 set above, the amount of glue used can be reduced as much as possible while ensuring the structural strength.

Taking as an example that the battery cells 20 are in one-to-one correspondence with the adhesion members 50 and the blocking member 53 is provided, the battery 10 is tested, wherein as an example, the first adhesion structure 51 and the second adhesion structure 52 can both be made of polyurethane material. Specifically, before the test, the area ratios of the adhesion members 50 are first set according to the parameters described in the "Initial ratio (S1+S2)/S0" in Table 1, respectively, moreover, the area ratio S1/(S1+S2) of the first adhesion structure 51 to the second adhesion structure 52 is set to 0.15, and the test condition is 60° C. Wherein, considering that the adhesion member 50 is provided on the surface of one side wall of one battery cell 20, the ratio of the contact area of the adhesion member 50 with the surface to the area of the surface cannot be greater than 1, and therefore, the values of the "Initial ratio (S1+S2)/S0" in Table 1 are all less than or equal to 1. In a cyclic test experiment, the voltage range is 2.8V to 4.2V, charging is performed at a rate of 2 C, then discharging is performed at a rate of 3 C, and after 800 cycles, a cycling capacity retention rate is obtained, wherein the cycling capacity retention rate is the ratio of the 3C discharge capacity of the 800th cycle relative to the 3C discharge capacity of the 2nd cycle, which is the "capacity retention rate" in Table 1; and moreover, after 800 cycles, a coupled temperature vibration impact test is performed to determine the results of the "vibration impact" in Table 1; if the vibration impact test is passed, the area ratio of the remaining adhesion member 50 on the surface of the battery cell 20 is determined by an ultrasonic detector, that is, the last column of the "remaining cohesive glue area ratio" in Table 1 is correspondingly obtained, and the remaining cohesive glue area ratio is still set as (S1+S2)/S0.

TABLE 1

| | Initial ratio (S1 + S2)/S0 | Performance 1 Capacity retention rate | Performance 2: Vibration impact | Performance 3: Remaining cohesive glue area ratio (S1 + S2)/S0 |
|---|---|---|---|---|
| Example 1 | 0.25 | 70.4% | Pass | 0.23 |
| Example 2 | 0.5 | 80.1% | Pass | 0.40 |
| Example 3 | 0.85 | 83.3% | Pass | 0.8 |
| Example 4 | 1 (Glue overflow) | 84.6% | Failure | / |
| Comparative Example 1 | 0.2 | 65.4% | Failure | / |

retention rate is reduced as compared to the battery capacity retention rate of Example 2 and Example 3, and the remaining cohesive glue area ratio is also reduced. Therefore, when 0.5≤(S1+S2)/S0≤0.85, the vibration impact and the capacity retention rate of the battery are better.

Further, similar to the test conditions in Table 1, the embodiments of FIG. 6 and FIG. 7 are still taken as examples, and as shown in Table 2, the test results are shown in Table 2 for different ratios of S1 to S2. Specifically, as shown in Table 2, in the case where (S1+S2)/S0 is set to 0.85, the ratio of S1 to S2 is adjusted, that is, the ratio of S1 to S2 is set in accordance with the "S1/(S1+S2)" shown in Table 2 to obtain three corresponding performances, in which the "remaining cohesive glue area ratio" is the ratio of S1/(S1+S2) measured after the vibration impact test.

TABLE 2

| | (S1 + S2)/S0 | S1/(S1 + S2) | Performance 1 Capacity retention rate | Performance 2: Vibration impact | Performance 3: Remaining cohesive glue area ratio S1/(S1 + S2) |
|---|---|---|---|---|---|
| Example 5 | 0.85 | 0.05 | 80.5% | Pass | 0.35 |
| Example 6 | 0.85 | 0.15 | 83.3% | Pass | 0.82 |
| Example 7 | 0.85 | 0.35 | 82.1% | Pass | 0.75 |
| Example 8 | 0.85 | 0.55 | 81.5% | Pass | 0.62 |
| Example 9 | 0.85 | 0.85 | 80.7% | Pass | 0.35 |
| Comparative Example 3 | 0.85 | 0.02 | 75.6% | Failure | / |
| Comparative Example 4 | 0.85 | 1 | 72.5% | Failure | / |

As can be seen from Table 1, when the contact area of the adhesion member 50 with the first surface 1111 or the contact area with the second surface 201 of the battery cell 20 is smaller, especially when the area ratio (S1+S2)/S0 is less than 0.25, for example (S1+S2)/S0 is equal to 0.2, the binding force of the adhesion structure 50 to the battery cell 20 is weak, there is a risk of failure due to vibration impact, and the capacity retention rate of the battery cell 20 is poor; whereas when the contact area of the adhesion member 50 with the first surface 1111 or the contact area with the second surface 201 of the battery cell 20 is too large, such as for example when the area ratio (S1+S2)/S0 is equal to 1, it may cause glue overflow and adhesion to the structural parts such as an electrode terminal of the battery cell 20 or a battery wiring harness, and in turn result in the risk of failure due to vibration impact; therefore, 0.25≤(S1+S2)/S0<1 can ensure that there is no battery failure under vibration, and can also ensure that the capacity retention rate of the battery is in a better range.

As can be seen from the data of Example 1-Example 2, when (S1+S2)/S0 is equal to 0.25, the battery capacity As can be seen from Table 2, the gluing area ratio of the first adhesion structure 51 at the edge position has an influence on the structural strength, and increasing the content of the first adhesion structure 51 in a certain range is beneficial to improving the structural strength of the battery 10 and enhancing the capacity retention rate. When S1/(S1+S2) is equal to 1, there is a failure of the battery 10 due to vibration impact, indicating that with only the first adhesion structure 51, the binding strength of the adhesion structure 50 to the battery 10 is weak. When S1/(S1+S2) is equal to 0.02, there is a failure of the battery 10 due to vibration impact, indicating that when the majority of the adhesion structure 50 is the second adhesion structure 52, it still can lead to the unbonding problem. When 0.05≤S1/(S1+S2)≤0.85, it can not only ensure that there is no failure of the battery 10 under vibration, but also ensure that the capacity retention rate of the battery 10 is in a better range. Comparing Example 5-Example 9, it can be seen that when 0.15≤S1/(S1+S2)≤0.55, the remaining cohesive glue area ratio is 0.62-0.82, and the anti-vibration impact performance of the battery 10 is better.

It should be understood that the thickness h of the adhesion member 50 can be set as 0.02 cm≤h≤1 cm, for example, it can be set as 0.05 cm≤h≤0.5 cm.

It should be understood that the above FIG. 8 to FIG. 14 are all described with one battery cell 20 being correspondingly provided with one adhesion member 50 as an example, and in contrast, it can also be configured that a plurality of battery cells 20 in the first battery cell group correspond to one adhesion member 50.

Figure 15:
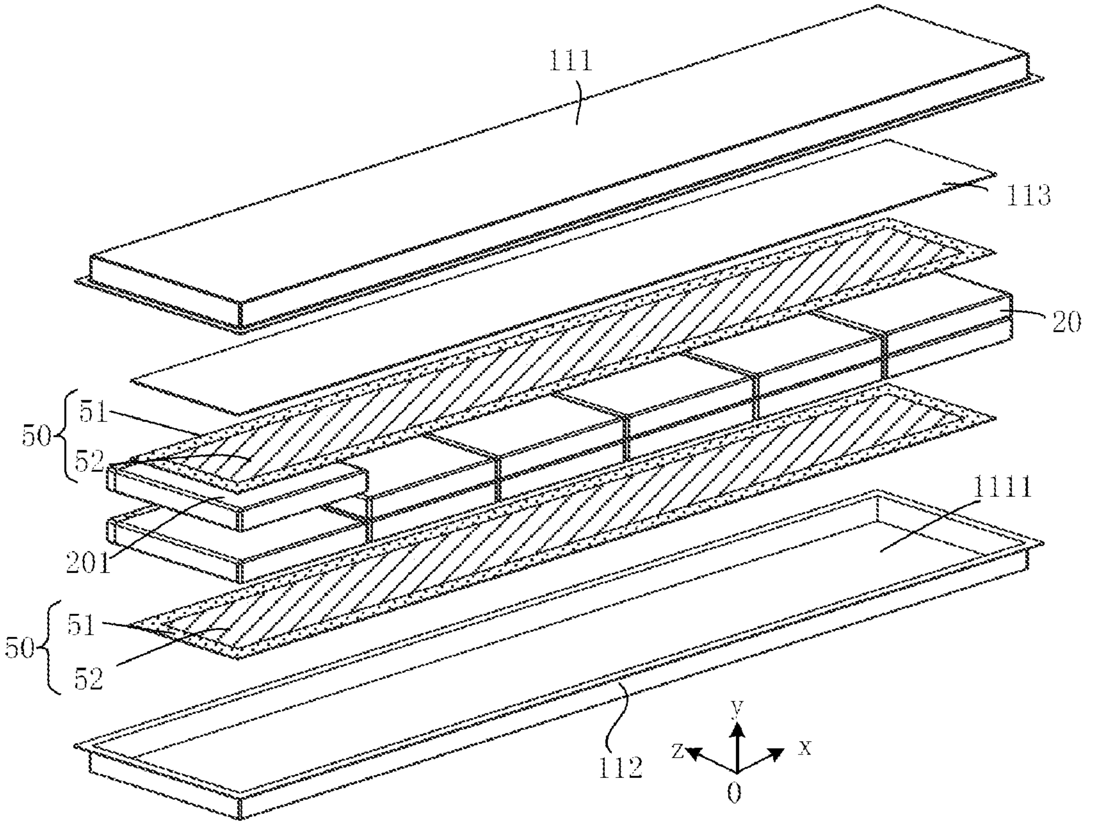
FIG. 15 is an exploded schematic structural view of yet another battery as disclosed in an embodiment of the present application.
Figure 16:
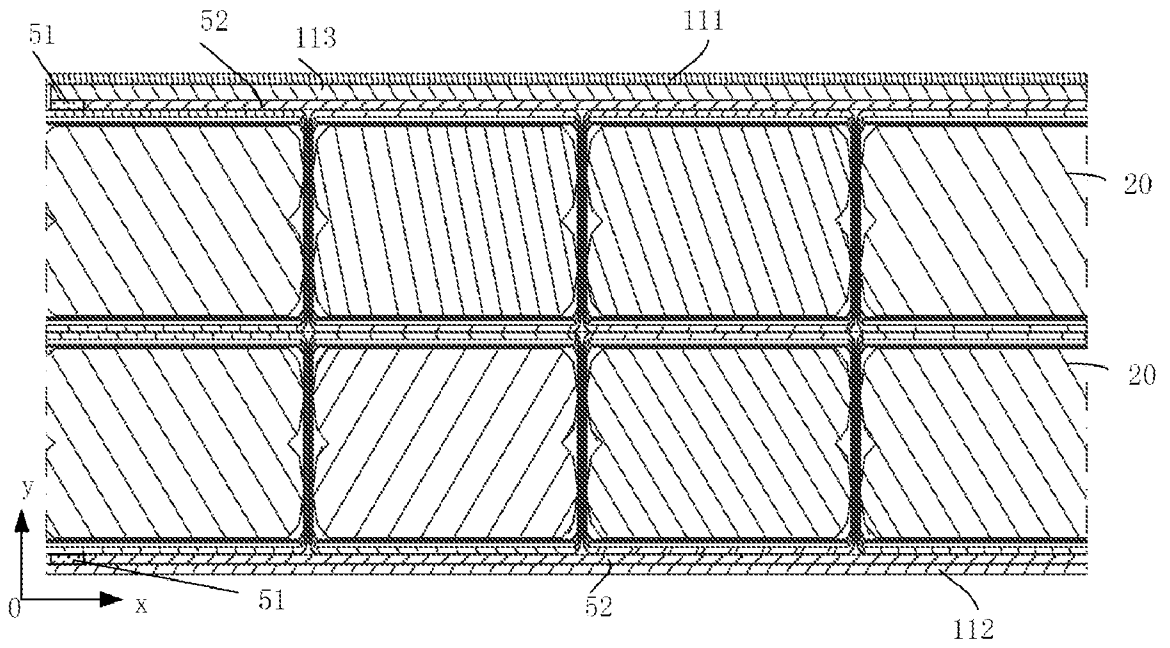
FIG. 16 is a partial cross-sectional view of the battery shown in FIG. 15.

In some embodiments, as another embodiment, a plurality of battery cells 20 in the embodiments of the present application may be correspondingly provided with one adhesion member 50. For example, FIG. 15 shows an exploded schematic view of another battery 10 according to the embodiments of the present application, and FIG. 16 is a partial cross-sectional view of FIG. 15; as shown in FIG. 15 and FIG. 16, one adhesion member 50 can be provided between the first battery cell group and the first surface 1111, that is, all the battery cells 20 in the first battery cell group are correspondingly provided with one adhesion member 50; and for another example, it is also possible to provide a plurality of adhesion members 50 between the first battery cell group and the first surface 1111, wherein each adhesion member 50 corresponds to a plurality of battery cells 20.

Figure 17:
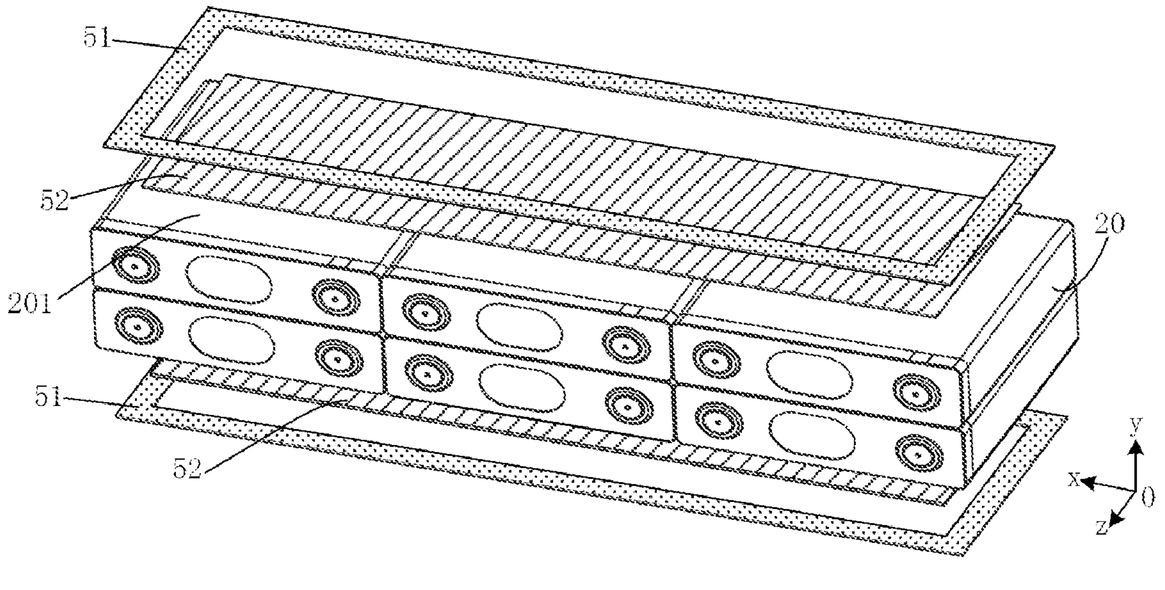
FIG. 17 is an exploded schematic structural view of a plurality of battery cell and an adhesion member as disclosed in an embodiment of the present application.
Figure 18:
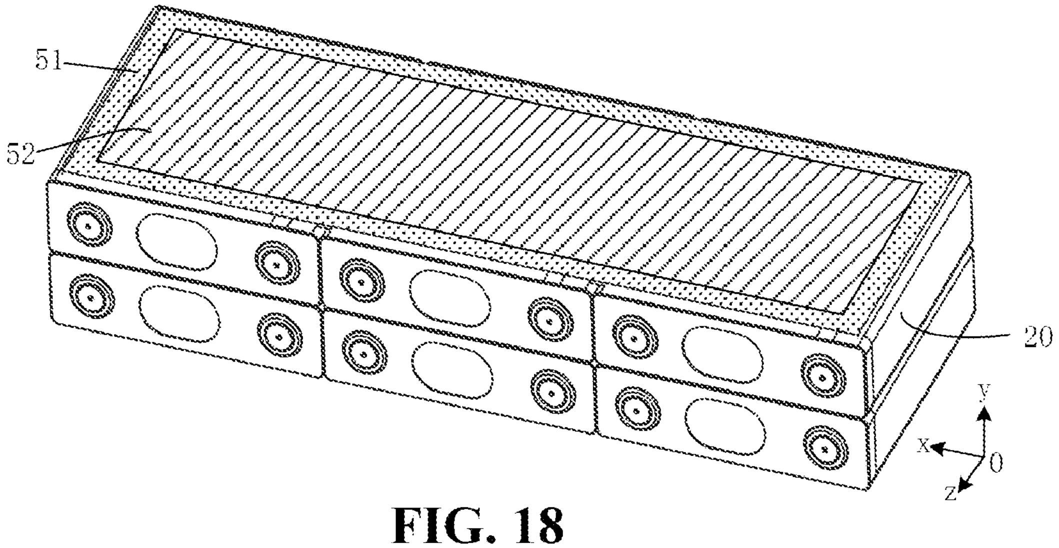
FIG. 18 is a schematic view of a plurality of battery cells provided with adhesion members as disclosed in an embodiment of the present application.

Specifically, FIG. 17 shows an exploded schematic view of a plurality of battery cells 20 and an adhesion member 50 according to the embodiments of the present application, and FIG. 18 shows a schematic view of a plurality of battery cells 20 provided on the surface thereof with an adhesion member 50 according to the embodiments of the present application. For convenience of illustration, as shown in FIG. 17 and FIG. 18, taking as an example here that one adhesion member 50 is provided on the second surface 201 of three battery cells 20, that is, the second surface 201 provided with one adhesion member 50 comprises one side wall of each battery cell 20 of the three battery cells 20. The plurality of battery cells 20 are correspondingly provided with the same adhesion member 50, and when a large number of battery cells 20 are included in the battery 10, the processing procedures can be simplified.

Figure 19:
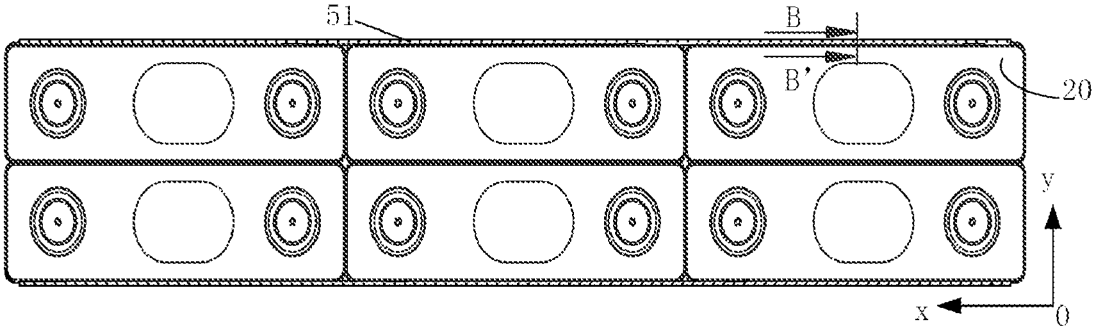
FIG. 19 is a side view of a plurality of battery cells provided with adhesion members as disclosed in an embodiment of the present application.

It should be understood that when comparing the difference between FIG. 17 and FIG. 8 or comparing the difference between FIG. 18 and FIG. 9, the difference between them is only the number of battery cells 20 corresponding to one adhesion member 50. Moreover, the partial cross-sectional view taken in the direction of B-B' in FIG. 19 is consistent with FIG. 11, and will not be repeated here for brevity.

It should be understood that one adhesion member 50 may be located at any region of the second surface 201 of the plurality of battery cells 20. For example, as shown in FIG. 15 to FIG. 18, the adhesion member 50 may almost completely cover the second surface 201 of the plurality of battery cells 20; alternatively, the adhesion member 50 may occupy a local region of the second surface 201. Moreover, as shown in connection with FIG. 19 and FIG. 11, the surfaces of the plurality of battery cells 20 constitute the second surface 201, and after the expansion and deformation of the battery cells 20, the deformation amount of the central region of the side wall of each battery cell 20 is larger, whereas the deformation amount of the edge region is smaller, that is to say, the distance from the central position of the battery cell 20 to the first surface 1111 is less than the distance from the edge region to the first surface 1111; therefore, the second adhesion structure 52 with a smaller elongation at break and a higher strength can be provided at the central position of the second surface 201, that is, the second adhesion structure 52 covers the central point of the second surface 201, so that the second adhesion structure 52 can cover the central points of the plurality of battery cells 20 as much as possible, and the first adhesion structure 51 is located at the edge position all around the second surface 201 to avoid the risk of edge unbonding. Wherein, the central region or the central position of the second surface 201 comprises the central point of the second surface 201. In this way, the second adhesion structure 52 at the central position of the second surface 201 can ensure the relative stability between the plurality of battery cells 20 and the first surface 1111, and the relatively large elongation at break of the first adhesion structure 51 at the edge all around the second surface 201 can ensure that there is no unbonding between the edge all around the battery cells 20 and the first surface 1111.

In some embodiments, referring to the embodiments of FIG. 12 and FIG. 13, in the case where one adhesion member 50 is provided on the surfaces of a plurality of battery cells 20, it is also possible to provide a blocking member 53 or to provide a gap between the first adhesion structure 51 and the second adhesion structure 52 to avoid the mutual influence between the first adhesion structure 51 and the second adhesion structure 52.

In some embodiments, in the case where one adhesion member 50 is provided on the surfaces of a plurality of battery cells 20, that is, when one adhesion member 50 is provided between the second surface 201 jointly formed by the plurality of battery cells 20 and the first surface 1111, the area of the second surface 201 is denoted as S0, the contact area of the first adhesion structure 51 with the second surface 201 is denoted as S1 (correspondingly, the contact area of the first adhesion structure 51 with the first surface 1111 can also be denoted as S1), and the contact area of the second adhesion structure 52 with the second surface 201 is denoted as S2 (correspondingly, the contact area of the second adhesion structure 52 with the first surface 1111 can also be denoted as S2), and S0, S1 and S2 satisfy: $0.25 \le (S1+S2)/S0 < 1$. For example, S0, S1 and S2 can be set to satisfy: $0.5 \le (S1+S2)/S0 \le 0.85$. Further, S1 and S2 can also be set to satisfy: $0.05 \le S1/(S1+S2) \le 0.85$, for example, S1 and S2 can be set to satisfy: $0.15 \le S1/(S1+S2) \le 0.55$.

Similar to the effects of the embodiments of FIG. 4 to FIG. 14, by the area ratio of the first adhesion structure 51 to the second adhesion structure 52 set above, the amount of glue used can be reduced as much as possible while ensuring the structural strength, which will not be repeated here.

In some embodiments, the thickness h of the adhesion member 50 can be set as 0.02 cm≤h≤1 cm, for example, it can be set as 0.05 cm≤h≤0.5 cm.

It should be understood that the positions where the adhesion member 50 of the embodiments of the present application and the like are described above in connection with the accompanying drawings, and the materials of the adhesion member 50 will be described in detail below.

In the embodiments of the present application, the elongation at break of the first adhesion structure 51 is greater than the elongation at break of the second adhesion structure 52. Specifically, the elongation at break A1 of the first adhesion structure 51 can be set to satisfy: $100\% \le A1 \le 500\%$; and/or the elongation at break B1 of the second adhesion structure 52 can be set to satisfy: $10\% \le B1 \le 150\%$. For example, the elongation at break A1 of the first adhesion structure 51 satisfies: $150\% \le B1 \le 400\%$; and/or the elongation at break B1 of the second adhesion structure 52 satisfies: $60\% \le B1 \le 120\%$.

In some embodiments, the elongation at break of the first adhesion structure 51 and the second adhesion structure 52 in the embodiments of the present application can be tested with reference to ISO 527-2, a fully cured adhesive tape is used, wherein the stretching speed is 10 mm/min.

For example, the first adhesion structure 51 and the second adhesion structure 52 can be peeled off from the first surface 1111 or the second surface 201 by cutting or freezing, cut into blocks of 10 mm*20 mm with a thickness of 1 mm, and tested for elongation at break by a tensile machine, referring to ISO 527-2 for the specific test method.

It should be understood that the first adhesion structure 51 and the second adhesion structure 52 can also be configured to satisfy other relationships, considering that for such adhesion structure as a glue or the like, the strength is generally positively correlated with the elastic modulus, and the elongation at break is negatively correlated with the elastic modulus.

In some embodiments, the elastic modulus of the first adhesion structure 51 can be set to be smaller than the elastic modulus of the second adhesion structure 52. Specifically, the elastic modulus A2 of the first adhesion structure 51 can be set to satisfy: 10 MPa≤A2≤150 MPa; and/or the elastic modulus B2 of the second adhesion structure 52 can be set to satisfy: 150 MPa≤B2≤1000 MPa. For example, the elastic modulus A2 of the first adhesion structure 51 is set to satisfy: 30 MPa≤A2≤60 MPa; and/or the elastic modulus B2 of the second adhesion structure 52 is set to satisfy: 150 MPa≤B2≤500 MPa.

It should be understood that the elastic modulus in the embodiments of the present application is an elastic modulus at normal temperature, and the elastic modulus can be tested with reference to IPC-TM-650 2.4.24.4, which is a standard test method for testing glue strength using dynamic thermomechanical analysis (DMA).

In some embodiments, the strength of the first adhesion structure 51 can also be set to be less than the strength of the second adhesion structure 52. Specifically, the strength A3 of the first adhesion structure 51 can be set to satisfy: 2 MPa≤A3≤15 MPa; and/or the strength B3 of the second adhesion structure 52 can be set to satisfy: 6 MPa≤B3≤25 MPa. For example, the strength A3 of the first adhesion structure 51 satisfies: 6 MPa≤A3≤15 MPa; and/or the strength B3 of the second adhesion structure 52 satisfies: 8 MPa≤B3≤25 MPa.

It should be understood that the strength in the embodiments of the present application may include bulk strength and/or shear strength. Specifically, the bulk strength is tested with reference to ISO 527-2, a fully cured adhesive tape is used, and the stretching speed is 10 mm/min. The shear strength is tested with reference to GB/T 7124.

In some embodiments, the material of the first adhesion structure 51 of the embodiments of the present application may be selected to be a material that is liquid or pasty before solidification, for example, at least one of the following materials may be selected: epoxy resin, polyurethane, acrylic resin and silicone rubber; and/or the material of the second adhesion structure 52 may also be selected to be a material that is liquid or pasty before solidification, for example, at least one of the following materials may be selected: epoxy resin, polyurethane and acrylic resin.

It should be understood that when selecting the materials of the first adhesion structure 51 and the second adhesion structure 52, if materials of the same system with different characteristics are selected, there may be mutual influence between the two, for example, glues of the same polyurethane system with different characteristics are selected as the materials for the first adhesion structure 51 and the second adhesion structure 52, the two may react and influence each other, so it is necessary to provide a blocking member 53 or a gap between the first adhesion structure 51 and the second adhesion structure 52; and if the materials of the first adhesion structure 51 and the second adhesion structure 52 are selected such that they do not react nor influence each other, for example, silicone rubber and polyurethane-based structural glue are selected respectively, then the blocking member 53 and the gap may not be provided, and the embodiments of the present application are not limited thereto.

Therefore, in the battery 10 according to the embodiments of the present application, the adhesion member 50 comprising two adhesion structures is provided between the battery cell 20 and the first component to fix the battery cell 20, wherein the first component may comprise a box body of the battery 10 or an upper cover 113 within the box body, so that the first adhesion structure 51 with a higher elongation at break is located at the periphery of the second adhesion structure 52 with a lower elongation at break, so that after the expansion and deformation of the battery cell 20, the edge position is the first adhesion structure 51 with high elongation at break, which is able to maintain the connection between the battery cell 20 and the upper cover 113 or between the battery cell 20 and the box body fixed, thus improving the stability of the battery cell 20 within the battery 10, and in turn improving the safety of the battery 10.

The battery 10 according to the embodiments of the present application has been described above, and a method and an apparatus for making a battery according to the embodiments of the present application will be described below, in which the portions not described in detail can be found in the foregoing embodiments.

Figure 20:
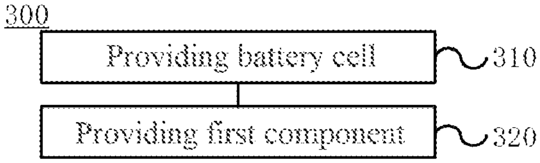
FIG. 20 is a schematic flowchart of a method for making a battery as disclosed in an embodiment of the present application.

FIG. 20 shows a schematic flowchart of a method 300 for making a battery according to an embodiment of the present application. As shown in FIG. 20, the method 300 may comprise: S310, providing a battery cell 20; providing a first component, wherein a first surface 1111 of the first component is connected to at least one of the battery cells 20 through an adhesion member 50, the adhesion member 50 comprises a first adhesion structure 51 and a second adhesion structure 52, the first adhesion structure 51 is located at the periphery of the second adhesion structure 52, and the first adhesion structure 51 has an elongation at break greater than that of the second adhesion structure 52.

Figure 21:
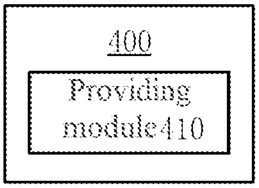
FIG. 21 is a schematic block diagram of an apparatus for making a battery as disclosed in an embodiment of the present application.

FIG. 21 shows a schematic block diagram of an apparatus 400 for making a battery according to an embodiment of the present application. As shown in FIG. 21, the apparatus 400 may comprise: a providing module 410. The providing module 410 is used for: providing a battery cell 20; providing a first component, wherein a first surface 1111 of the first component is connected to at least one of the battery cells 20 through an adhesion member 50, the adhesion member 50 comprises a first adhesion structure 51 and a second adhesion structure 52, the first adhesion structure 51 is located at the periphery of the second adhesion structure 52, and the first adhesion structure 51 has an elongation at break greater than that of the second adhesion structure 52.

While the present application has been described with reference to the preferred embodiments, various improvements can be made and components therein can be replaced with equivalents without departing from the scope of the present application. In particular, the technical features mentioned in the various embodiments can be combined in any way as long as there are no structural conflicts. The present application is not limited to the particular embodiments disclosed herein, but rather includes all technical solutions falling within the scope of the claims.

What is claimed is:

1. A battery, comprising:

a battery cell; and a first component, wherein a first surface of the first component is connected to a second surface of at least one of the battery cells through an adhesion member, the adhesion member comprises a first adhesion structure and a second adhesion structure, the first adhesion structure is located at the periphery of the second adhesion structure, wherein the first adhesion structure and the second adhesion structure are both positioned between the first surface and the second surface, and the first adhesion structure has an elongation at break greater than that of the second adhesion structure.

2. The battery according to claim 1, wherein the elongation at break A1 of the first adhesion structure satisfies: 100%≤A1≤500%; and/or, the elongation at break B1 of the second adhesion structure satisfies: 10%≤B1≤150%.

3. The battery according to claim 1, wherein the second adhesion structure covers a central point of the second surface.

4. The battery according to claim 1, wherein the first adhesion structure surrounds the periphery of the second adhesion structure.

5. The battery according to claim 1, wherein the area of the second surface is S0, the contact area of the first adhesion structure with the second surface is S1, the contact area of the second adhesion structure with the second surface is S2, and S0, S1 and S2 satisfy:

$$0.25 \leq (S1+S2)/S0 < 1.$$

6. The battery according to claim 5, wherein S0, S1 and S2 satisfy:

$$0.5 \leq (S1+S2)/S0 \leq 0.85.$$

7. The battery according to claim 1, wherein the contact area of the first adhesion structure with the first surface is S1, the contact area of the second adhesion structure with the first surface is S2, and S1 and S2 satisfy: 0.05≤S1/(S1+S2) ≤0.85.

8. The battery according to claim 7, wherein S1 and S2 satisfy:

$$0.15 \leq S1/(S1+S2) \leq 0.55.$$

9. The battery according to claim 1, wherein the elastic modulus of the first adhesion structure is less than that of the second adhesion structure.

10. The battery according to claim 9, wherein the elastic modulus A2 of the first adhesion structure satisfies: 10 MPa≤A2≤150 MPa; and/or, the elastic modulus B2 of the second adhesion structure satisfies: 150 MPa≤B2≤1000 MPa.

11. The battery according to claim 1, wherein the strength of the first adhesion structure is less than the strength of the second adhesion structure.

12. The battery according to claim 11, wherein the strength A3 of the first adhesion structure satisfies: 2 MPa≤A3≤15 MPa; and/or, the strength B3 of the second adhesion structure satisfies: 6 MPa≤B3≤25 MPa.

13. The battery according to claim 1, wherein the battery comprises a plurality of the battery cells, a plurality of the adhesion members are provided between the plurality of the battery cells and the first surface, and the plurality of the adhesion members correspond to the plurality of the battery cells on a one-to-one basis.

14. The battery according to claim 1, wherein a gap is provided between the first adhesion structure and the second adhesion structure.

15. The battery according to claim 1, wherein a blocking member is provided between the first adhesion structure and the second adhesion structure.

16. The battery according to claim 1, wherein the battery comprises a first box body and a second box body, the first box body and the second box body are snap-fitted to form an accommodating space for accommodating the battery cell, and the first component comprises the first box body and/or the second box body.

17. The battery according to claim 1, wherein the battery comprises an upper cover, a first box body and a second box body, the first box body and the second box body are snap-fitted to form an accommodating space for accommodating the battery cell, the upper cover is provided within the accommodating space and covers the battery cell, and the first component comprises the upper cover.

18. The battery according to claim 16, wherein a surface of the first box body and/or the second box body with the largest area is the first surface.

19. The battery according to claim 1, wherein the battery cell comprises:

an electrode assembly;

a case provided with an opening and having a cavity for accommodating the electrode assembly; and a cover plate for covering the opening of the case.

20. An electrical apparatus, comprising: the battery according to claim 1, wherein the battery is used for providing electric energy for the electrical apparatus.

* * * * *